United States Patent [19]
Peil

[11] Patent Number: 5,428,267
[45] Date of Patent: Jun. 27, 1995

[54] REGULATED DC POWER SUPPLY

[75] Inventor: William Peil, N. Syracuse, N.Y.

[73] Assignee: Premier Power Systems, Inc., N. Syracuse, N.Y.

[21] Appl. No.: 911,096

[22] Filed: Jul. 9, 1992

[51] Int. Cl.$^6$ ............................................. H02M 3/335
[52] U.S. Cl. ........................................ 315/224; 363/17; 363/132; 315/244; 315/307; 315/DIG. 7; 315/DIG. 5
[58] Field of Search .................. 363/16, 17, 95, 97, 363/98, 131, 132; 315/209 R, 219, 208, 307, 291, 82, 224, DIG. 725, 244

[56] References Cited

U.S. PATENT DOCUMENTS

| | | | |
|---|---|---|---|
| 4,873,616 | 10/1989 | Fredrick et al. | 315/DIG. 7 |
| 4,885,671 | 12/1989 | Peil | 363/17 |

OTHER PUBLICATIONS

Unitrode Linear Integrated Circuits Data and Applications Handbook. Pp. 4–120 through 4–126 (1825); pp. 4–172 through 4–178 (1846).

*Primary Examiner*—Benny Lee
*Assistant Examiner*—Michael B. Shingleton

[57] ABSTRACT

The invention relates to a DC power supply utilizing DC to AC to DC conversion with pulse to pulse current mode IC controlled PWM modulation at an above-sonic repetition rate (e.g., 30 Khz) in a degenerative feedback loop to achieve output regulation.

The powder supply, which includes a step-down transformer and a choke input LC filter, is designed for energizing a short-arc, lamp and provides glow to arc transition energization, regulated run energization, and igniter controls. Output regulation may be either of current or power and is based on using a current emulating the current flowing into the filter choke or using both the emulating current and a voltage sensed in a separate secondary winding of the transformer. A novel ramp generating circuit which preserves loop sensitivity at high power loads and a novel method of powering the controlling IC are also disclosed.

18 Claims, 9 Drawing Sheets

REGULATED DC POWER SUPPLY

BACKGROUND OF THE INVENTION

1. Field of the Invention

The invention relates to the provision of regulated DC energization to a load and, more particularly, to the provision of regulated DC energization utilizing high frequency (e.g., 30 Khz) DC to AC to DC conversion with pulse width modulation being used in a degenerative feedback loop to achieve output regulation.

2. Prior Art

A recently developed high speed PWM controller in the form of an eight section IC has been made available for the manufacturer of regulated DC power supplies. The integrated circuit and its internal organization thus suggests the functional configuration of a power supply for which it provides control. In general, the most common source of energization is that available from an AC mains of 50 or 60 Herz, one phase or three phase, at one of several common voltages. The power supply will conventionally contain a first section in which the AC is converted to sustained DC, followed by a DC to AC to DC converter which, in the interests of economics, will operate in the AC stage of the converter above the audible frequency range and below the radio frequencies that are commonly used for communication. A common selection, and one herein employed, is approximately 30 kHz. The regulation which is achieved in power supplies controlled by the foregoing integrated circuit is by means of pulse width modulation of the AC wave form. The process works to readjust the pulse width on a pulse by pulse current mode PWM basis. In the interest of efficiency, the power transistors used for conversion normally operate between "on" and "off" states and produce an output of bi-directional rectangular pulses. Thus the process develops high frequency transients that make an inhospitable environment for a sensitive IC, particularly if the IC is to be energized from energy derived from the DC to DC converter.

In addition, the IC requires an externally provided ramp for comparison with an error quantity to determine the widths of individual pulses in the pulse by pulse current mode modulation process. The usual ramp generated at a capacitor which is charged through a serial resistance from a DC source provides a diminishing slope as time advances from the beginning of the ramp until it is timed out. The result is that the regulation process, where gain depends on the slope of the ramp, loses gain in the higher power limits where gain is most needed.

Power supplies, particularly when used to regulate load current or power supplied to a low voltage load, require a power transformer to match the lower voltage requirement. In the case of a short arc lamp, the lamp may require a run voltage of 20 to 40 volts and the power level may be at the kilowatt levels. The power transformer is thus a necessary item and one of considerable expense, requiring a carefully optimized design. Ideally the transformer should facilitate sensing for output regulation and provide ancillary power for the control circuits.

Finally, in a short arc lamp power supply, the lamp requires in succession 30,000 to 50,000 volts for ignition (Phase I), 100 volts for glow to arc transition (Phase II), and 20 to 40 volts at large currents for run (Phase III) energization. The sensing should accurately reflect the current or power supplied to the arc lamp during run operation and yet be immune to the energization supplied during ignition or transition.

SUMMARY OF THE INVENTION

Accordingly, it is an object of the invention to provide an improved DC power supply in which regulation is achieved by the use of pulse to pulse current mode PWM modulation in a degenerative feedback loop.

It is another object of the invention to provide in a PWM regulated power supply, in which the regulation gain is dependent upon the slope of a ramp, an improved ramp generating circuit which prevents deterioration of the regulation gain at high power levels.

It is a further object of the invention to provide an improved regulated power supply in which load current and/or power sensing is improved.

It is still another object of the invention to provide a power supply having improved means for regulating "run" energization of a short-arc lamp which is immune to energization during starting.

It is an additional object of the invention to provide in a pulse to pulse current mode PWM low voltage power supply, in which control is exerted by an integrated circuit, improved means for providing transient free energization of the integrated circuit.

These and other objects of the invention are achieved in a novel power supply which is specifically designed to provide glow to arc transition and run energization to a short-arc lamp and which is suitable for energization from an AC main. The novel supply comprises means to convert the AC energy at the mains to sustained DC energy and means which are subject to pulse to pulse current mode PWM modulation to convert the sustained DC energy to pulses of alternating polarity. The last recited means includes a power transformer (PT) having a primary winding and a first secondary winding, and alternately conducting transistor switches subject to PWM control, which are connected to the DC source to supply current pulses of opposite polarity to the PT primary winding. These alternating pulses are then converted to pulses of one polarity, followed by application to a choke input LC filter which provides a low ripple DC output to the load.

In accordance with the invention, pulse to pulse current mode PWM modulation is achieved by means connected to the control electrodes of the transistor switches which include a current transformer connected in the current path of at least one transistor switch to sense the current in the PT primary winding, and which also include means for converting the sensed current into a DC current which emulates the rectified current in the choke inductor, the emulating means comprising an RC network and a rectifier.

The emulating current is them used for pulse width modulation of the pulses of alternating polarity, the pulse width modulating means being connected in a degenerative feedback loop for regulation.

In accordance with a further aspect of the invention, the power transformer is provided with a second secondary winding which is used to sense flux and thereby sense the voltage across the PT secondary winding supplying power to the load. The emulating current and the sensed voltage are then used jointly in the PWM process and, when properly weighted, permit the regulation to accurately reflect the output lower.

In accordance with another aspect of the invention, the output of the current transformer is used to power a novel ramp generating circuit having an ever-increasing slope for sustaining degenerative loop gain at higher power levels. This is achieved by proper selection of the choke inductance and transformer magnetizing inductance to create a slope on each pulse of current flowing in the current transformer. The voltage derived from the current transformer secondary (typically 13 volts) is rectified and used to energize the RC network which forms the ramp. As each ramp (generally less than 5 volts) is generated, the input slope is always larger and, as a result, the ramp has an ever-increasing slope.

In accordance with a further aspect of the invention, a novel transconductance regulator is provided which, while energized by a low impedance pulsed source with transient energy, provides regulated low transient output suitable for energizing a sensitive integrated circuit.

BRIEF DESCRIPTION OF THE DRAWINGS

The inventive and distinctive features of the invention are set forth in the claims of the present application. The invention, itself, however, together with further objects and advantages thereof, may best be understood by reference to the following description and accompanying drawings, in which:

FIG. 1B showing the disposition of one of the heat dissipating switching transistors installed on the control board, the second sub-assembly, the chassis sub-assembly being the first.

DESCRIPTION OF THE PREFERRED EMBODIMENT

General

Figure 1:
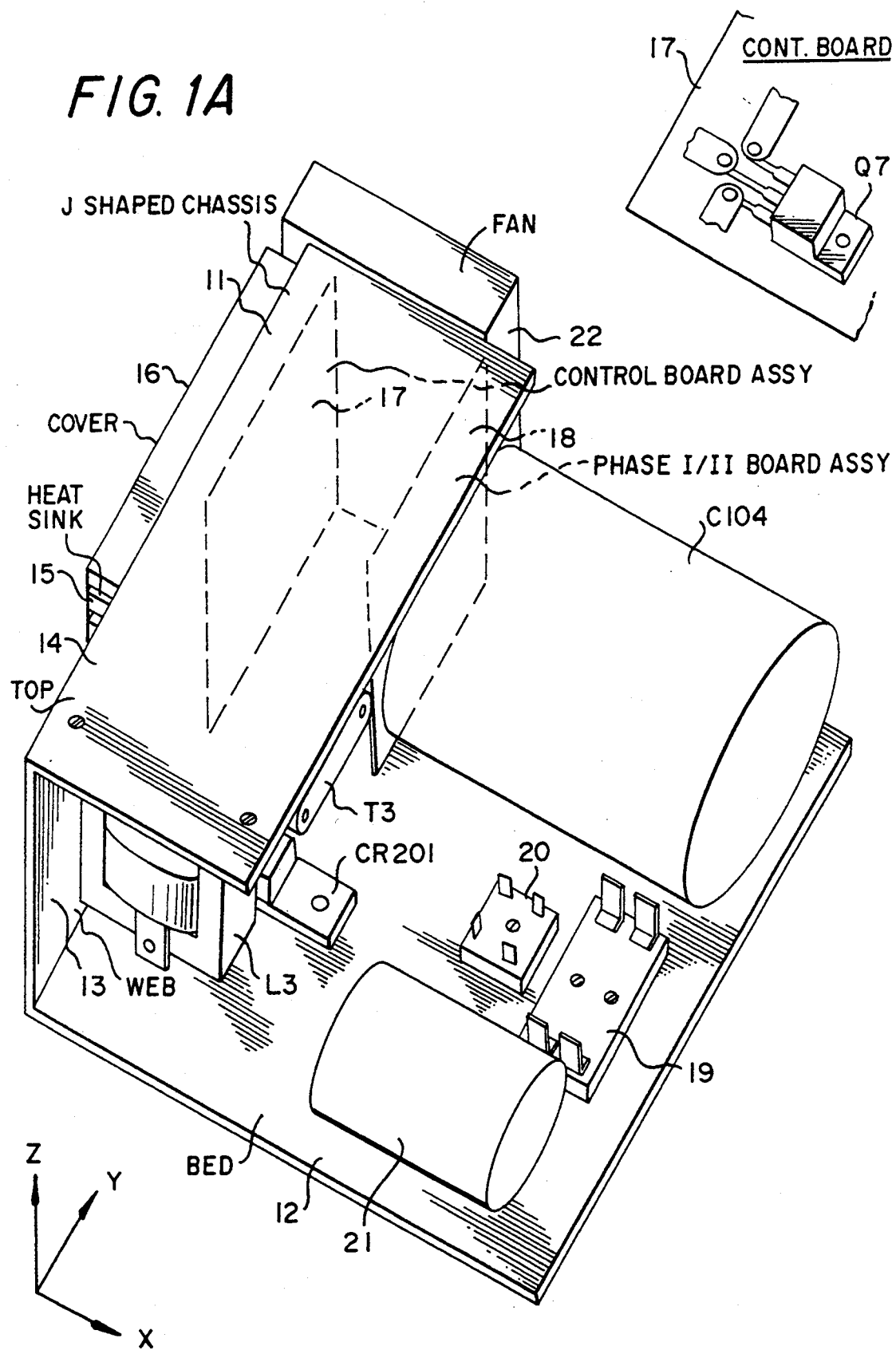
FIGS. 1A and 1B are perspective views of a novel power supply providing glow to arc transition and run energization for a short-arc lamp in accordance with the invention, FIG. 1A showing the disposition of the four sub-assemblies and four individual parts constituting the power supply.

FIG. 1 is a perspective view of a novel power supply providing glow to arc transition (Phase II) and run (Phase III) energization for a short-arc lamp. The "run" voltage provided to the lamp is typically 20 to 40 volts DC, and 105 volts DC is provided for the glow to arc transition. An external ignitor providing an ignition pulse in the range of 30,000 to 50,000 volts is required for lamp ignition. A contact in relay K101 (FIG. 5A) within the power supply is designed to control the ignitor.

The illustrated embodiment is designed to provide a nominal two kilowatts of power to a Xenon or Mercury Xenon short-arc lamp. The power may be drawn from a (single phase) 240 VAC (or 208 VAC) 50/60 Hertz switched main, but may be readily adapted for three phase power. The power supply has an electrical efficiency of approximately 90% and a power factor of 0.65. The power supply is approximately 8"×8"×3.5" and weighs 8 lbs.

The illustrated embodiment of the power supply is designed to be placed within the vented enclosure of a host equipment, and contains a fan which provides the necessary cooling of the heat dissipating components. The use of an enclosure, not illustrated, protects operating personnel from the shock hazard. In addition, the host equipment also provides a circuit breaker or contactor which performs the on-off functions and customarily over current protection for the host equipment and contained power supply. An in-rush protection feature is provided within the power supply which limits the current drain from the AC mains when the supply is first energized to avoid tripping circuit breakers in the current supply path.

The power supply is subject to controls adapted to the requirements of the short-arc lamp and to the conditions under which it may be expected to be used. The output power level can be electronically controlled over a 4 to 1 range. The control range depends upon noise considerations and can be increased under certain operating conditions. The range of adjustment is thus greater than the customary 30% range used to accommodate for lamp differences. The output power level, which is controlled by a novel power or "pseudo-power" feedback circuit, provides constant output power to the lamp as its characteristics change during aging to reduce the light output. Safer and more reliable operation is achieved when constant power is provided to the lamp.

The power supply contains supervision of over-temperature within the power supply and of under-voltage at the connection to the switched AC mains. The over-temperature may be the result of blockage of the vents supplying air to the power supply. The under-voltage protection is designed to protect against use of the supply in a mode in which there is not sufficient voltage "head room" to provide power regulation. This may be the result of excessive drops in line cords in portable applications.

The power supply is easily paralleled with like supplies to provide power to higher power lamps. The supply, in the event of a short circuit, continues to deliver limited power, which protects the supply, and has the advantage of clearing up low-grade short circuits which may occur with some failure modes of the lamp.

The power supply is designed to allow computer control. Once the mains interrupter or breaker in the host equipments is closed, the power supply is partially energized and has an optically isolated enable function operating in response to a logic level command to initiate lamp ignition and the delivery of power to the lamp.

As an aid to servicing and maintenance, visual indicators are provided that show the state of the power supply at three stages in its operation.

Assembly and Thermal Design

Figure 3:
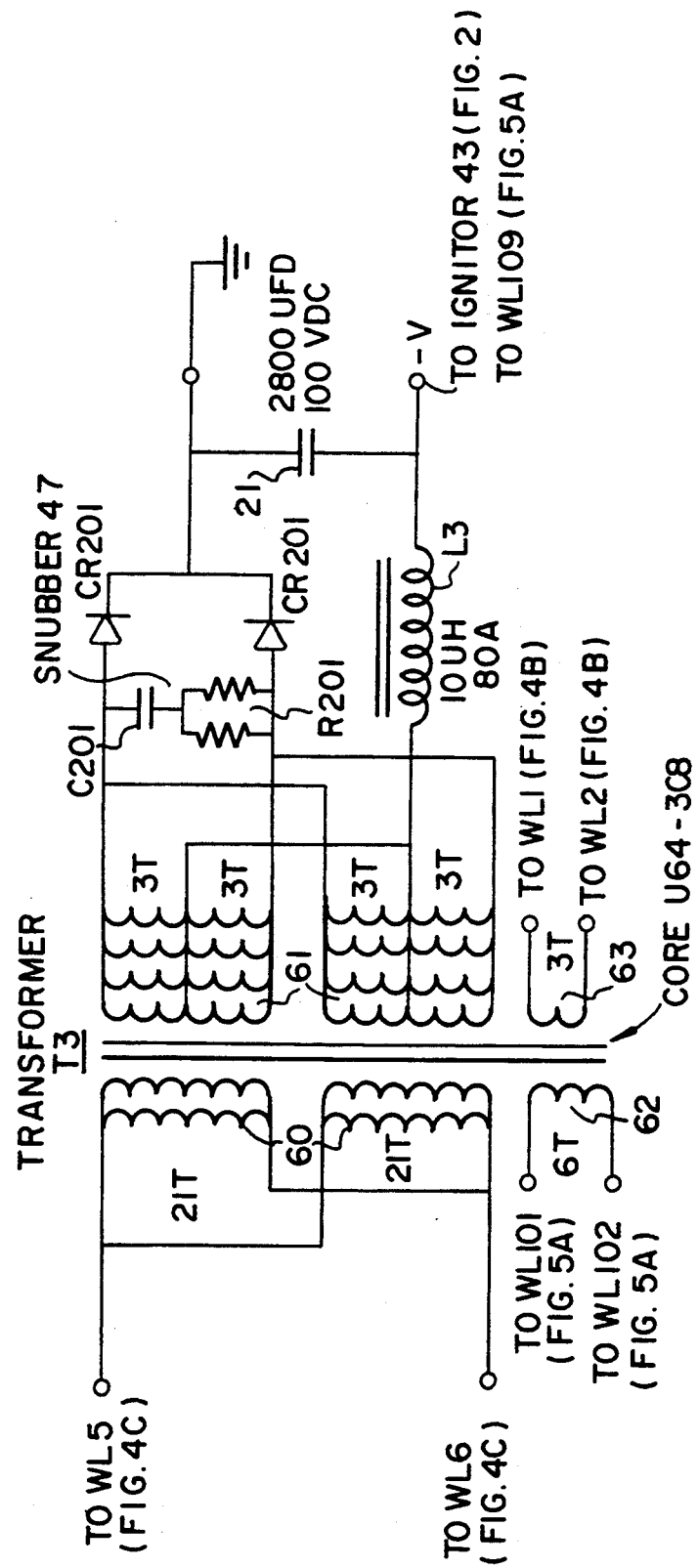
FIG. 3 is an electrical circuit diagram of the magnetics sub-assembly, the third sub-assembly, and the output filter capacitor, which is an individual part.

FIG. 1A illustrates the spacial disposition of the sub-assemblies and individual parts making up the power supply. There are four sub-assemblies and four individual parts. The chassis sub-assembly includes the J chassis 11 (which comprises the bed 12, web 13, and top 14), the finned heat sink 15, and a heat sink cover 16. The magnetics sub-assembly, whose electrical circuit diagram is shown in FIG. 3, includes the power transformer T3, the full wave rectifier CR201, the output filter choke L3, the secondary snubber 47, comprising capacitor C201, and resistor R201. The two other sub-assemblies are printed wiring boards; the control board 17 and the Phase I/II board 18 which includes the large capacitor C104. The "individual parts" include the fuses 19 at the connection to the switched mains, the input rectifier bridge 20, the output filter capacitor 21, and the fan 22.

The J chassis 11 is formed of a single sheet of heavy gauge electrical grade aluminum, folded into a three part "J" shaped configuration. Electrical grade aluminum is preferred because its thermal conductivity is much greater than conventional construction grade aluminum. The chassis may be installed in any convenient position but, for purposes of spacial reference, it will be assumed that the larger part or bed 12 is place "down" in a first horizontal plane, while the web 13 is in a vertical plane and the top 14 is placed higher "up" in a second horizontal plane above the first horizontal plane. "Up" and "down" mean relative positions measured along the vertical or "Z" axis as shown in FIG. 1A. Relative positions measured along the "X" axis will be referred to as "front" and "back", as shown, and those measured along the "Y" axis will be referred to as "right" and "left", as shown.

The control board 17, hidden from view in FIG. 1A, is shown by a dashed outline in FIG. 1A. It is mounted upon the web 13 and spaced a short distance in front of it to form a passage for cooling air driven from right to left by the fan 22. The cooling air thus flows over both the front and back surfaces of the control board. A principal source of heat from the control board assembly is the four power transistors (Q7–Q10) (FIG. 4C) of the transistor bridge. The power transistors are insulated gate bipolar transistors of recent design. A suitable transistor is the International Rectifier type IRGBC-40U. As best shown in FIG. 1B, the power transistors are formed in TO-220 cases, each of which consists of a flat mounting tab (drilled for screw mounting) supporting the transistor "chip", within an insulating box-shaped plastic package. The mounting tab extends from one side of the package while the three leads for connection to the emitter, gate and collector electrodes extend from the other side of the package. The mounting tab provides a good heat conduction path to the die, in which the power transistor's heat originates, while the leads extending in the opposite direction provide electrical connections independent of, and spaced from the thermal connection. This provision greatly simplifies the cooling of the power transistors, which require adequate cooling to avoid thermal damage.

The space between the web 13 and the control board 17 is made large enough to allow the four power transistors Q7–Q10 (FIG. 4C) to be mounted between the web and the control board. The power transistors are fastened with the mounting tabs held flat against the front surface of the web 13, with thermal insulating pads being added to insure good thermal conduction paths, while providing electrical isolation. The four sets of three leads, which extend up in the upper two transistors and down in the lower two transistors, are all bent forward for insertion into and soldering to plated through holes on the control board. The heat path from the power transistors thus continues from the chip into the mounting tab and, via the tab, the insulating pads and the web 13 and thermal grease directly to the finned heat sink 15 on the back side of the web. The power transistors are the major source of heat on the control board and the path to the finned heat sink 15, just described, removes most of the heat generated by the power transistors. The remaining heat removal is accomplished by cooling air driven by the fan 22 along the back and front surfaces of the control board.

In front of the control board 17, but not completely hidden in the FIG. 1A drawing, is the Phase I/II board assembly with a large input filter capacitor C104 (FIG. 5B) mounted upon it.

The magnetics sub-assembly, which includes the components T3, CR201, L3, C201 and R201 enumerated earlier and connected as shown in FIG. 3, is attached to different portions of the chassis as generally shown in FIG. 1A. The power transformer T3 is fastened to the front surface of the web 13 to the left of the two boards 17 and 18. The full wave rectifier CR201 is fastened to the bed 12 directly under the transformer T3. The filter choke L3 is fastened to the chassis top 14, to the left of the transformer and near the left edge of the chassis. The transformer T3's secondary snubber components C201 and R201 are not visible in FIG. 1A but are self-supporting with their leads being attached to the terminals of the full wave rectifier CR201.

The finned heat sink 15 of the chassis sub-assembly has a flat front face attached to the back face of the web 13 with thermal grease being provided between the adjacent surfaces for good thermal contact. The fins of the heat sink on the back face lie in horizontal planes extending from left to right so that air driven from left to right passes freely along the fins for laminar flow and maximum cooling efficiency. A cover 16, mounted behind the heat sink, is provided to confine the cooling air to a path along the finned back surface. The cooling fan 22, an individual part, is mounted at the right side of the chassis. The heat sink cover 16 is bent up adjacent to the fan to duct fan-driven cooling air into the path between the heat sink and the cover.

The positions of the other "individual parts" are shown in FIG. 1A. The fuses 19 are supported upon the bed 12 toward its front edge, with the input rectifier bridge 20 placed immediately behind, the two being aligned generally to the left of the large input capacitor C104. The output filter capacitor 21, the fourth individual part, is attached to the bed at the left edge of the chassis, near the front and to the left of the fuses 19 and rectifier bridge 20.

The fan 22 forces cooling air over all parts of the power supply requiring cooling, the assembly providing efficient distribution. The cooling air from the fan 22 is immediately distributed along a first path between the finned heat sink 15 and cover 16, a second path between the web 13 and bottom of the control board 17, and a third path between the two boards. After passing the boards, the cooling air from the second and third paths then circulates around the heat dissipating parts of the magnetics sub-assembly for which cooling is of a lower priority.

The physical assembly of the power supply is designed to provide adequate cooling, assuming appropriate venting of the power supply enclosure. The enclosure should provide a first vent at the right side of the chassis for supplying cooling air to the fan 22, and a second vent at the left side of the chassis for expelling heated air which has absorbed heat in its passage through the chassis. The air distribution described permits the very high power to volume ratio of 11 watts per cubic inch, while maintaining all the components at safe operating temperature consistent with a long and reliable life.

Power System

Figure 2:
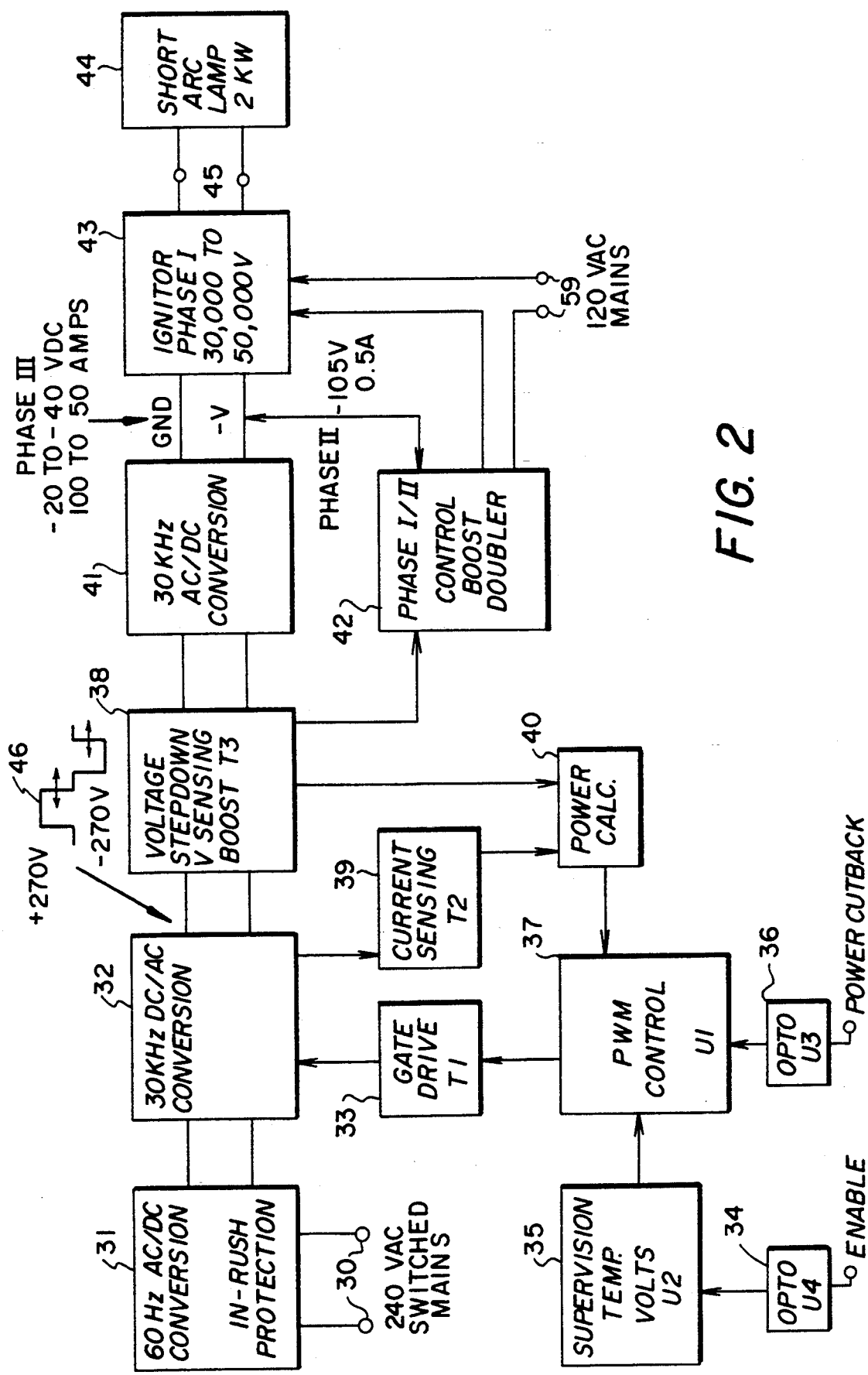
FIG. 2 is a block diagram of a power system for a short-arc lamp which incorporates the novel power supply and combines ignition energization.

The block diagram in FIG. 2 illustrates the power system for a short-arc lamp which incorporates the novel power supply and which combines an ignitor 43, not itself a part of the power supply. FIG. 2 also illustrates the overall organization of the novel power supply.

The power system comprises thirteen blocks, 31 through 43, which will be identified with the major sub-assemblies and the principal functions that each performs. A detailed treatment of the novel power supply, and further clarification of the novel features, will be deferred to the actual circuit diagrams of FIGS. 3, 4A, 4B, 4C, 5A and 5B and accompanying description.

The power system derives its energy form a source of 240 V 60 Hz AC electrical energy at a switched AC main in the host equipment to which the input terminals 30 of the power supply are connected. The power supply itself consists of the twelve blocks 31 through 42.

The first block 31 of the power supply provides AC to DC conversion with in-rush protection; the blocks 32 through 38 convert the DC to 30 Khz pulse width modulated square waves of alternating polarity, subject to both external and internal controls; and the block 41 converts the 30 KHz square waves to DC which, for run operation (Phase III), lies between −20 and −40 volts and provides a current between 100 and 50 amperes. The blocks 32, 38 and 41, to which DC is applied and from which DC is derived, will be referred to as a DC to DC converter. Glow to arc transition (Phase II operation) energy of −105 VDC at about 0.5 amperes is supplied from a boost winding on the transformer T3 (FIG. 3) in block 38 to a boost doubler in block 42. The block 42 also controls the application of boost voltage and the 30,000–50,000 V ignition pulses from the ignitor 43, both controls being responsive to the state of the arc lamp.

The input terminals of the ignitor 43 are connected to the output terminals of blocks 41 and 42, and the output terminals of the ignitor are connected to the power system output terminals 45. The ignitor contains a lower impedance path between its 0 volt (or ground) input and output terminals and a relatively low DC but high AC impedance path between its negative input and output terminals constituted by an inductor (not shown).

The blocks 31 to 42 are made up of the earlier identified sub-assemblies and individual parts as follows:

The 60 Hz AC/DC conversion and in-rush protection block 31 includes the input fuses 19 and the full wave rectifier 20 which are "individual parts", connected to the Phase I/II board. The in-rush protection circuit forms a portion of the Phase I/II board. Block 31 also includes a first system diagnostic optical indicator (green LED CR109) designated to show that the 60 Hz AC to DC converter is functioning. The complete circuit diagram of block 31 is illustrated in FIG. 5B.

Figure 4A:
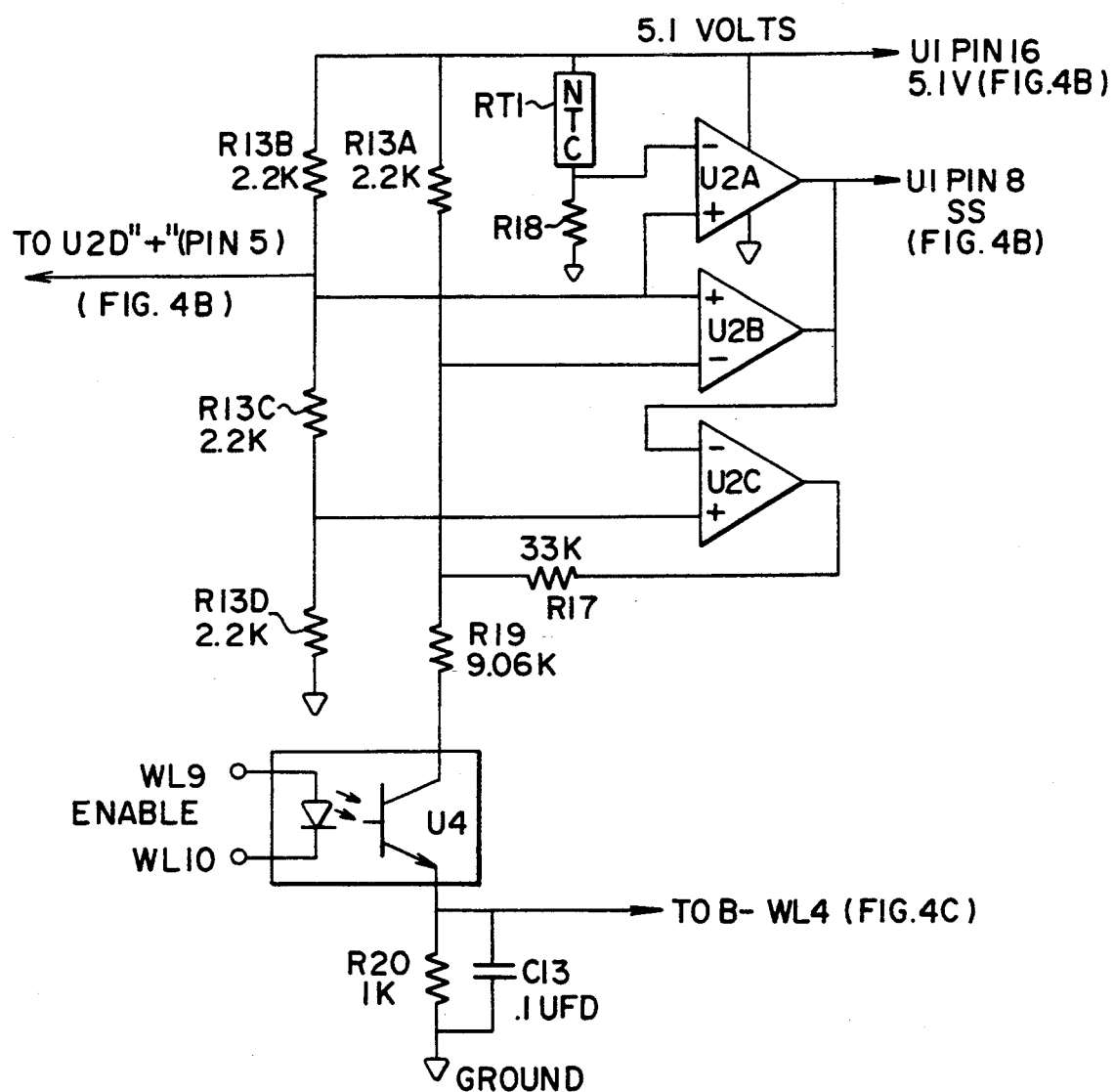
FIGS. 4A, 4B and 4C are a three-part electrical circuit diagram of the control board.
Figure 4B:
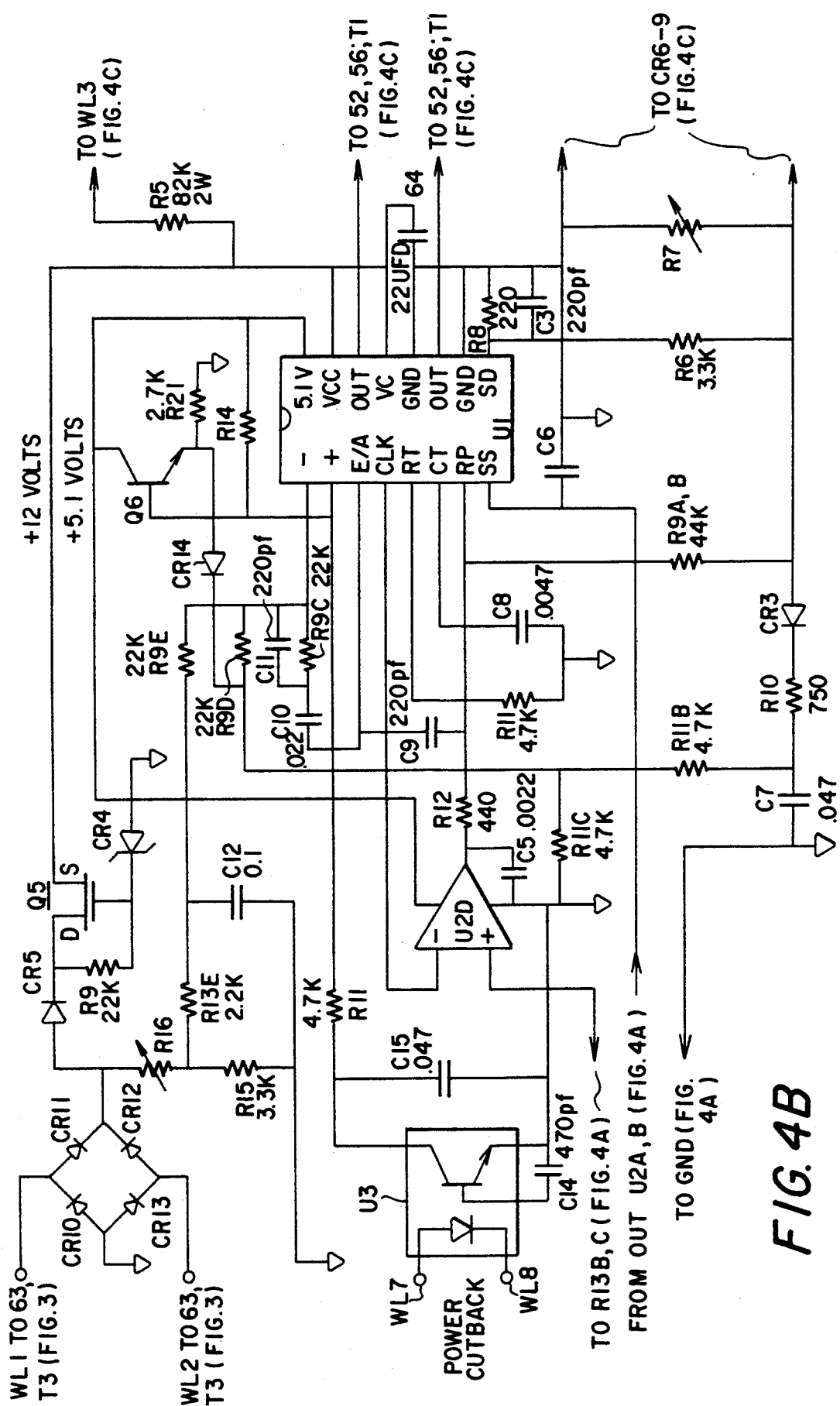
Figure 4C:
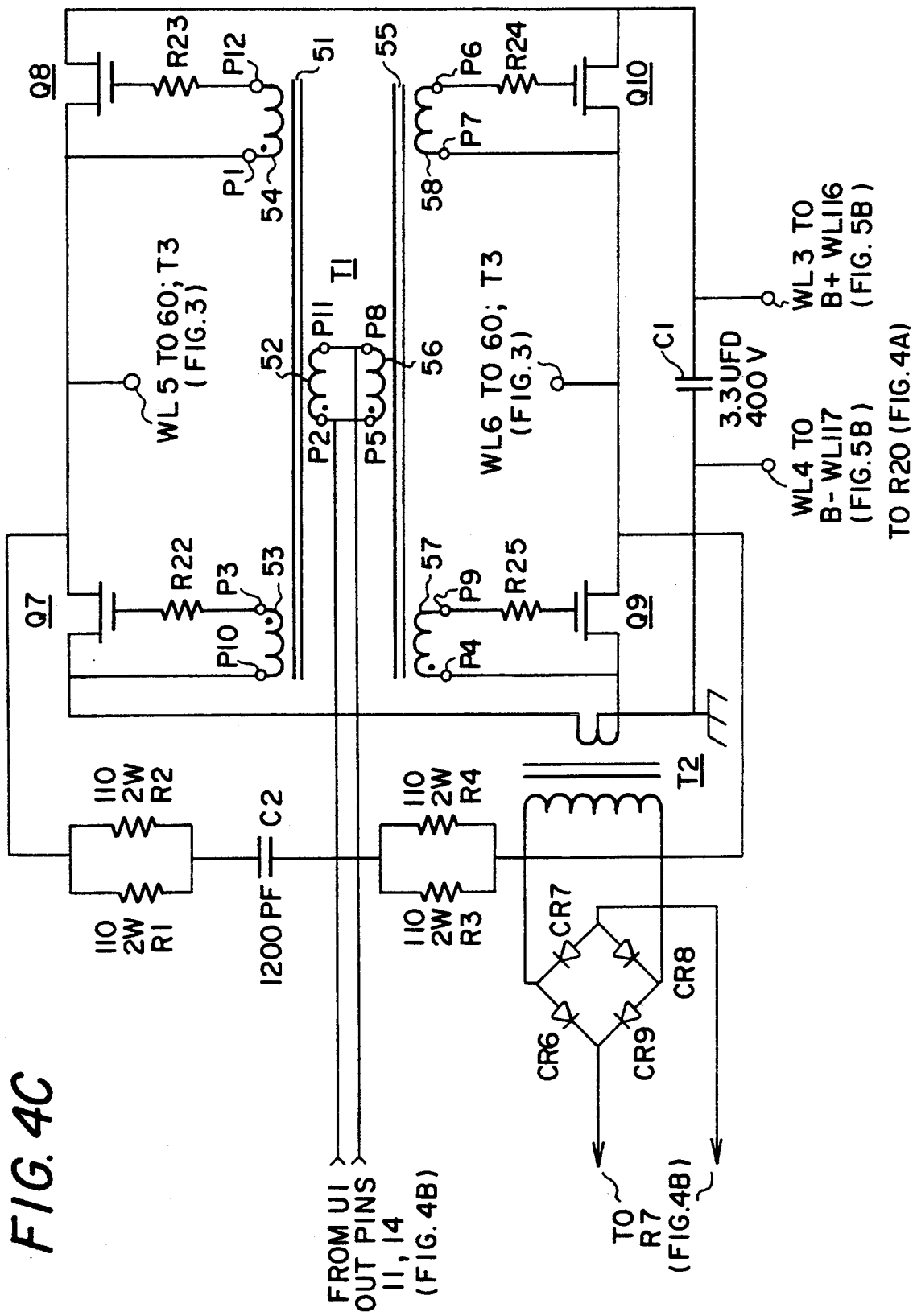

The 30 KHz DC/AC conversion block 32 which includes the four power transistors Q7–Q10; the gate drive block 33 which includes the gate drive transformer T1; and the current sensing block 39, which includes the current transformer T2 and the full wave rectifier CR6–9, form a portion of the control board assembly illustrated in the circuit diagram of FIG. 4C.

Figures 6A, 6B:
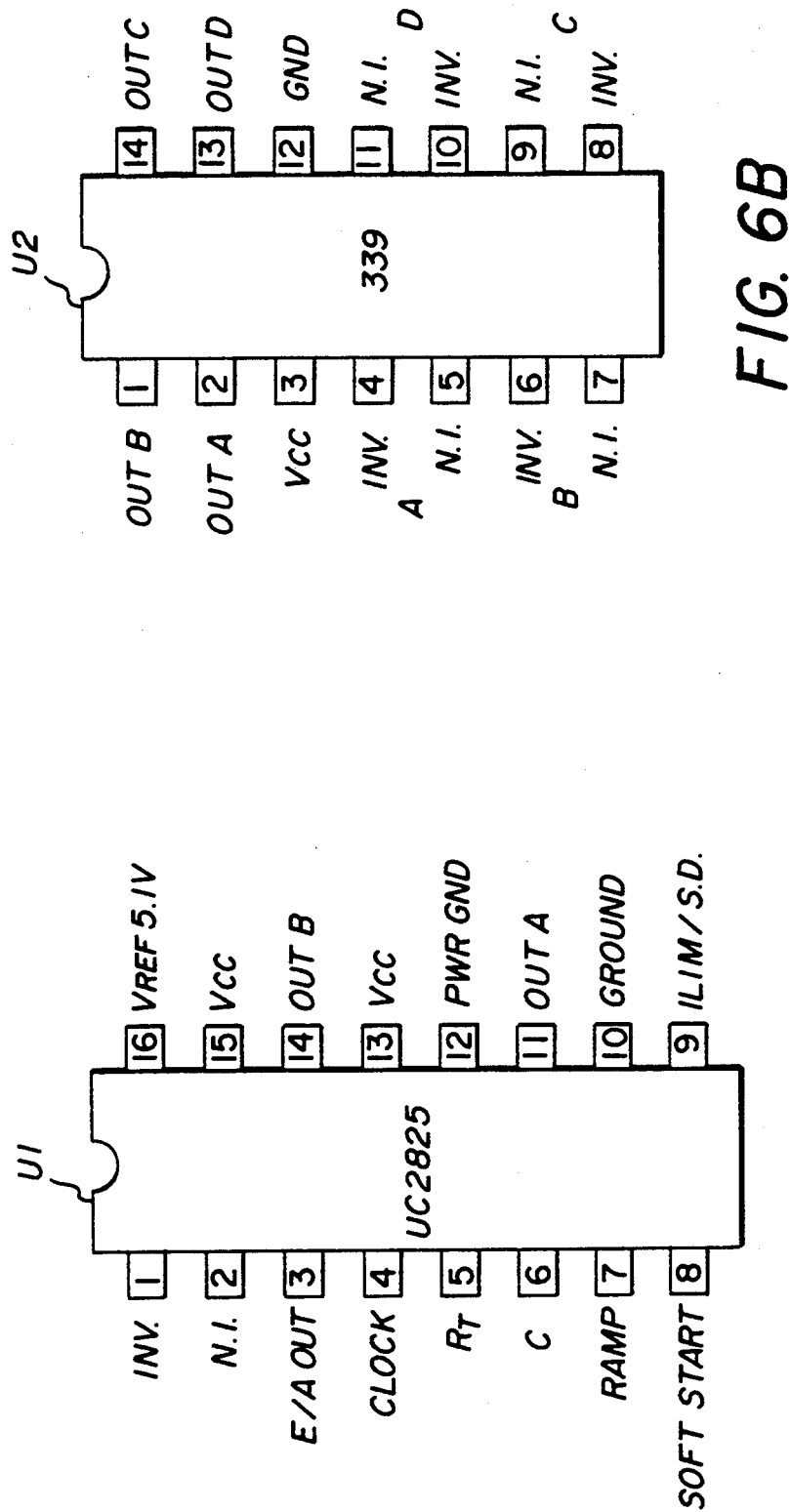
FIG. 6A contains the connection diagram of the PWM controller IC used on the control board, and FIG. 6B contains the connection diagram of the comparator IC used on both the control board and the Phase I/II board.

The high speed PWM control block 37 includes the IC U1 which provides pulse by pulse current mode pulse width modulation (PWM) in the DC to AC conversion process for controlling the output power. The block 36, which contains the opto-coupler U3, applies power cutback commands to the IC U1, whose pin layout is provided in FIG. 6A. The PWM control block 37 receives "supervisory" information from the supervision block 35, which senses over temperature and mains under voltage, and responds to enabling commands from the opto-coupler U4 of the enable block 34. The PWM control block 37 also receives power sensing information from the power calculating block 40, the latter responding to both output voltage supplied from the power transformer T3 in block 38, and output current supplied from block 32 via block 39. The blocks 34, 35, 36, 37 and 40 form a portion of the control board. The circuits of blocks 34 and 35 are illustrated in FIG. 4A, while the circuits of blocks 36, 37 and 40 are illustrated in FIG. 4B.

The 30 KHz AC to DC conversion block 41 includes the magnetics sub-assembly (i.e. T3, CR201, L3, 47, C201, R201) and the output filter capacitor 21. The circuit diagram of block 41 is provided in FIG. 3.

The Phase I/II control and Boost Doubler block 42 receives boost power from the step down power transformer T3 and contains a doubler for producing Phase II energization. Block 42 also contains a relay for controlling application of primer power to the ignitor, and logic responsive to the state of the arc lamp to control application of Phase I and Phase II energy. Block 42 also contains a second system diagnostic optical indicator (green LED CR106) designed to show when DC to DC conversion blocks 32, 38 and 41 are functional and a third system diagnostic optical indicator (orange neon DS1) that indicates doubler action to provide the Phase II voltage and Phase I ignition are turned on. Block 42 is a portion of the Phase I/II board. The circuit diagram of block 42 is provided in FIG. 5A.

Circuit Description and Operation

Figure 5A:
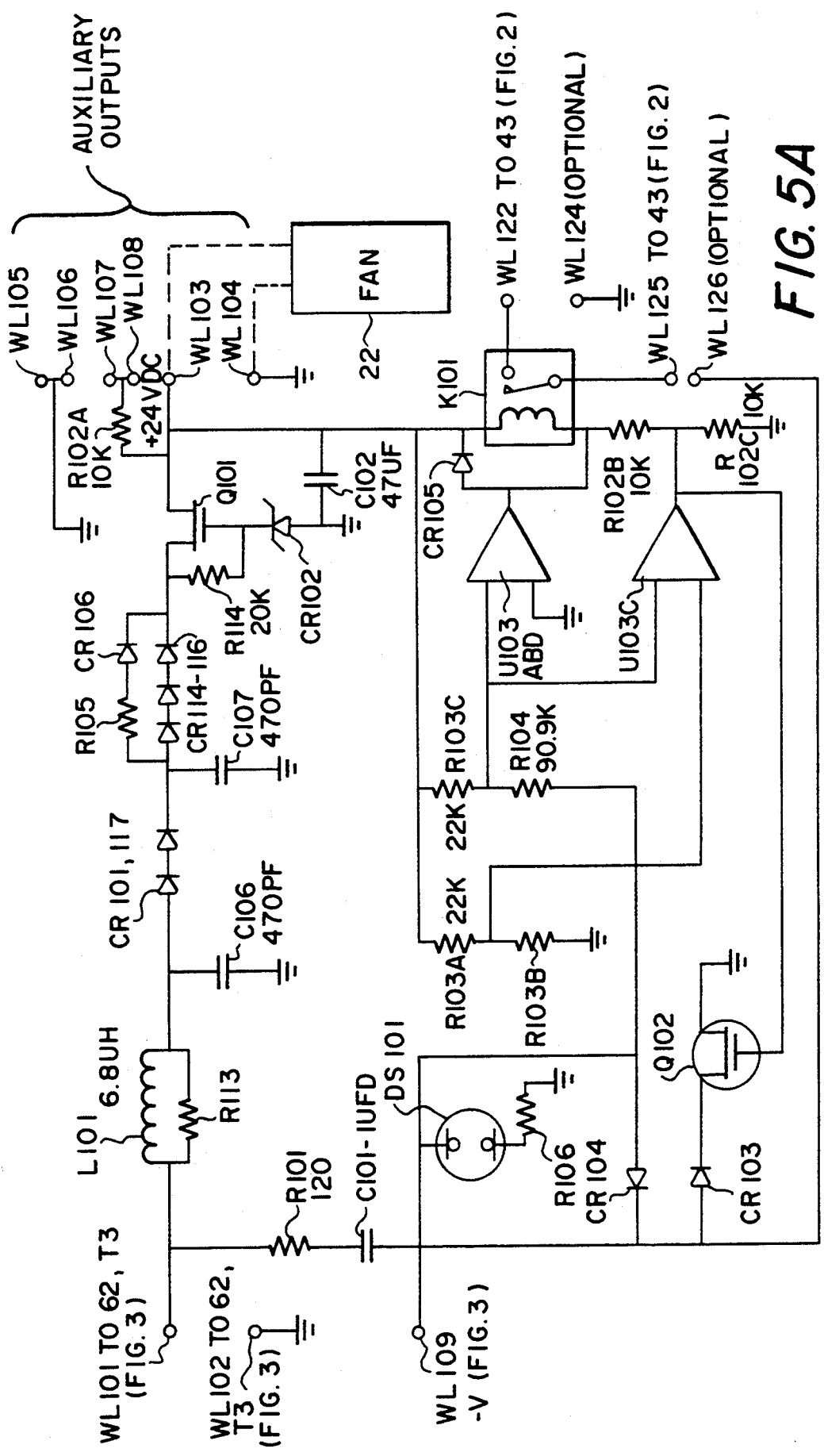
FIGS. 5A and 5B are a two-part electrical circuit diagram of the Phase I/II board forming the fourth sub-assembly, and remaining individual parts.
Figure 5B:
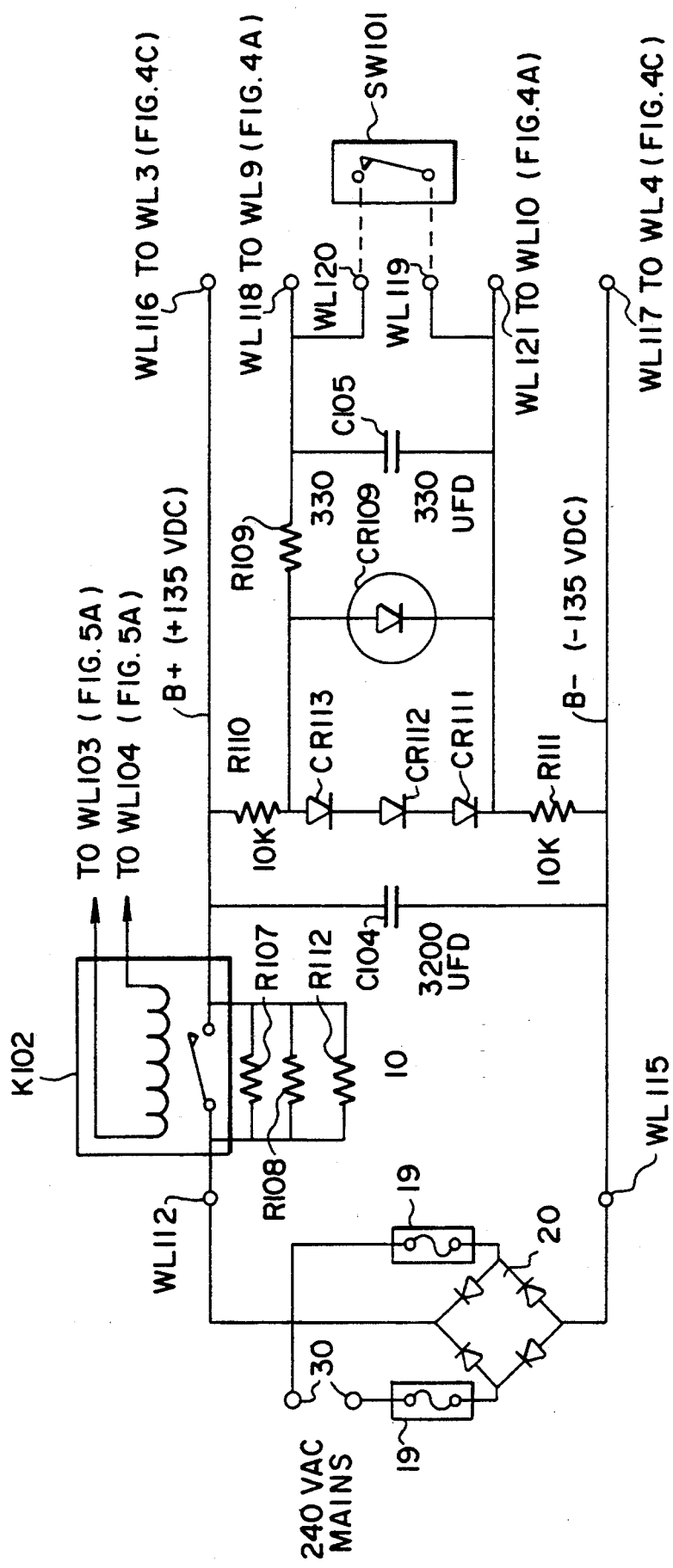

FIGS. 5A and 5B provide a circuit diagram of the Phase I/II board and certain individual parts and external elements connected to it. FIG. 5B contains a circuit diagram of the 60 Hz AC/DC conversion and in-rush protection block 31 (FIG. 2) and the first diagnostic circuit. The switched mains 30 are connected via fuses 19 in both paths to the AC input terminals of the rectifier bridge 20. The positive and negative DC output terminals of the bridge 20 are connected respectively to the positive and negative DC input terminals WL112 and WL115 of the Phase I/II board 18. The "WL" (meaning "wiring lug") terminals, which are illustrated by small circles, take the form of disconnects which permit the connectors to be connected or disconnected without breaking a soldered connection.

The circuit components illustrated in FIG. 5B, and lying within the circuitry bounded by the disconnects, are soldered to the Phase I/II board. Starting at positive input disconnect WL112, three 10 ohm 10 watt in-rush current limiting resistors R107, R108 and R112 are provided, each connected in parallel between input disconnect WL112 and the positive terminal of the 3200 microfarad 350 VDC input filter capacitor C104, which is connected to the positive output disconnect WL116. The negative terminal of the capacitor C104 is connected to the negative input disconnect WL115 and to the negative output disconnect WL117. As a result of rectification of the AC input applied to the bridge rectifier 20 and filtering by capacitor C104, +135 volts of filtered DC appears on the bus connected to WL116 and −135 volts of filtered DC appears on the bus connected to WL117.

The in-rush protection circuit of block 31 (FIG. 2) comprises the three resistors R107, R108 and R112 and in-rush protection relay K102. The resistors R107, R108 and R112 shunt the normally open contacts of the in-rush protection relay K102. The operating winding of the relay K102 is connected to a +24 volt bus connected to the disconnect WL103 (FIG. 5A), with both the winding and the 24 volt bus being referenced to chassis ground. The relay K102 has a 24 volt winding which tends to close its contacts at about 12 to 15 volts, and higher voltages insure that closure is sustained. The 24 volt bus at disconnect WL103 (FIG. 5A) provides operating voltage to close the relay K102 but does so, as will be explained, only after the capacitor C104 has had time to attain sufficient charge to limit the I×I×T (Current squared times Time) demand placed on the mains 30 to a reasonable value.

The balance of the circuit in FIG. 5B and, in particular, resistors R109–R111, diodes CR111–C113, and the green LED CR109 perform the diagnostic function of indicating that the AC to DC conversion in block 31 (FIG. 2) is taking place and provides energization for an optically isolated enable function in block 34 (FIG. 2) for the power supply.

The diagnostic circuit shown in FIG. 5B comprises the 10K ohm resistor R110, forward biased serially connected diodes CR113, CR112 and CR111, and the 10K ohm resistor R111. These components are serially connected between the +135 V bus and the −135 V bus in the order recited. The diodes CR111–CR113 produce an approximately 2.1 volt DC drop, centered approximately with chassis ground, to operate the LED CR109. A voltage to light the LED will thus be present whenever the rectifier bridge 20 is producing a DC output from the mains 30 on filter capacitor C104 sufficient to light the LED. The LED will usually come on some time before the capacitor C104 is fully charged, indicating that the block 31 is functional in performing the AC to DC conversion.

Referring primarily to FIGS. 4A, 4B, and 5B, the automatic enable function utilizes the foregoing circuit components associated with CR109, an opto-coupler U4 (FIG. 4A) on the control board, and, in addition, a 330 ohm resistor R109 and 330 microfarad filter capacitor C105 (FIG. 5B) on the Phase I/II board. The resistor R109 and capacitor C105 are serially connected in the order recited between the positive and negative terminals of the series diode "string". The positive capacitor terminal is connected to the dual disconnects WL118 and WL120 (FIG. 5B) and the negative capacitor terminal is connected to the dual disconnects WL119 and WL121. One set of disconnects (WL119 and WL120 (FIG. 4A)) is connected via disconnects WL9 and WL10 on the control board to the enable opto-coupler U4 in block 34 (FIG. 2). This connection provides a suitable voltage for causing the LED in opto-coupler U4 (FIG. 4A) to emit light and cause conduction by the optically sensitive transistor within it. Conduction by the opto-coupler U4 then provides an "enable" signal to the PWM control IC U1 (FIG. 4B) in block 37 (FIG. 2), allowing the IC to turn itself on and, when the under-voltage sensor for the IC U1 indicates that the +/−135 VDC buses (WL116, WL117) are at a proper voltage, allows the IC to begin the DC to DC conversion.

The second set of disconnects (WL118, WL121) (FIG. 5B) is available for an enable control on the host equipment at a place convenient to the operator. The control may take the form of a simple toggle switch (SPST) SW101 connected as shown to the disconnects WL120 and WL119. When the switch SW101 is open, the internal enable is free to operate. Thus, with the toggle switch open, when the power supply is connected to the mains 30 and the AC to DC conversion occurs, the DC to DC conversion under control of the PWM control IC will commence, once the DC busses are at operating voltage, and all the starting sequences will begin. When the toggle switch SW101 is closed a low impedance is connected across capacitor C105, discharging the capacitor and preventing voltage from being applied to operate the opto-coupler U4 (FIG. 4A). When the opto-coupler U4 is non-conductive the IC U1 (FIG. 4B) will not operate to provide the DC to DC conversion. Should the toggle switch be closed before the IC U1 is turned on, conversion will not take place; and should it be closed when the IC U1 is operating it will cause a shut down of the IC and will shut down the DC to DC conversion.

FIG. 5A, which is a circuit diagram of a portion of the Phase I/II board, contains the circuit of the phase I/II control and boost doubler block 42 (FIG. 2). The block 42 derives its power from the input disconnects WL101 and WL102 connected to the 6-turn winding 62 on the power transformer T3 (FIG. 3). In addition to providing power for the block 42, the illustrated portion of the Phase I/II board provides, at disconnects WL103 and WL104, 24 volts DC which keeps the contacts of relay K102 closed, drives the fan 22, and energizes the power cutback opto-coupler U3 (FIG. 4B), in the performance of which it delivers a total of five watts of electrical power.

The six-turn winding 62 on power transformer T3 (FIG. 3), which is connected to the disconnects WL101 and WL102 (FIG. 5A), performs a dual role. It energizes a novel transconductance regulator, shown in FIG. 5A, to provide the 24 volt DC power for circuits on the Phase I/II board and for circuits accepting power via the disconnects WL103 and WL104. The winding 62 also energizes the Boost Doubler to provide −105 volts DC Phase II energy for the arc lamp.

As shown in FIG. 5A, the transconductance regulator receives its power from disconnects WL101 and WL102, via an input filter, a half wave rectifier and a second diagnostic circuit showing operation of the 30 KHz DC/AC converter 32 (FIG. 2). The input filter comprises serially connected 6.8 microhenry filter choke L101, (the latter shunted by a resistor R113), and a shunt connected 470 picofarad filter capacitor C106. The half wave rectifier comprises two serially connected rectifiers CR101 and CR117, connected to the output of the filter, which supply the rectified output to the second diagnostic circuit. The second diagnostic circuit comprises an input shunt capacitor C107, and a floating 2.1 volt regulator comprising three serially connected diodes CR114, CR115 and CR116, the diodes being shunted by a series circuit consisting of 10 ohm current setting resistor R105 and a green light emitting diode CR106. The cathodes of the rectifier CR116 and of CR106 at the boundary of the diagnostic circuit are connected to the drain of the MOS-FET transistor Q101 which is the active element in the novel transconductance regulator. The source of transistor Q101, at which the regulated 24 volts DC appears, is connected to the terminal of the 47 microfarad storage capacitor C102 and to the disconnect WL103. The gate of transistor Q101 is connected, via 27 volt Zener diode CR102, to ground and to disconnect WL104. The cathode of the Zener diode is connected via 20K ohm resistor R114 to the cathode of CR116 to provide diode operating current.

The basic principle employed in providing 6 watts of 24 volt DC power, (see FIG. 5A circuit), is to rectify the PWM square wave (FIG. 2) derived from the 6-turn winding 62 of transformer T3 (FIG. 3), and then remove the inherent line voltage fluctuations with local regulation. Conventional capacitor input peak rectifiers generate very large peak currents that create interference, adversely affecting the operation of any neighboring ICs, including the control IC U1 (FIG. 4B). Resistor buffers, on the other hand, cause considerable power loss and are not desirable for continuously operated circuits drawing 5 watts or more of power.

The novel transconductance regulator herein employed receives power from winding 62 on transformer T3 (FIG. 3) in normal operation. Power is delivered to the circuit shown in FIG. 5A via disconnects WL101, WL102 via the filter (L101, R113, C106) via the half wave rectifier (CR101, CR117), via the floating 2.1 volt indicator regulator and is applied to the drain of MOS-FET transistor Q101 in the form of rectified positive square wave pulses. Those pulses cause a constant amplitude square wave of current to flow during the entire positive conduction cycle. The total charge flowing during the positive drain pulse exactly equals the charge flowing out of the regulator C102 over the entire 30 KHz period. If this were not true then the gate-source voltage would change via negative feedback to make the relationship correct. Assuming that the MOSFET transistor Q101 will begin to conduct at approximately 3 volts Vgs, typical for conventional MOSFET transistors, it will begin to conduct at 24 volts output potential, assuming a 27 volt Zener diode connected to the gate. If, perchance, the voltage across the output has fallen significantly below 24 volts, the conduction will initially be stronger but short lived, as larger currents quickly charge up capacitor C102 and reduce the Vgs voltage on transistor Q101. The circuit is intrinsically degenerative and tends to a stable condition in which the current conduction required to replace the current consumed by the load is distributed over the entire positive pulse period.

Continuing with the circuit shown in FIG. 5A, the turn-on and turn-off transients in half wave rectifier CR101, CR117 may also create interference. If the edges of the incoming square waves are not "softened" the rectifier may "snap" during turn-off, generating high frequency spikes that interfere with the operation of the ICs. The LC filter (L101, R113, C106) connected ahead of the rectifiers CR101, CR117, reduces the sharp transients prior to rectification, preventing interference. In addition, the two 470 picofarad capacitors C106 and C107, which respectively precede and follow the rectifiers CR101 and CR117, provide means to sweep out stored charge when the rectifiers are switched off.

A principal advantage of the novel transconductance regulator is that it avoids the large turn-on and/or turn-off currents of other regulators. Thus, interference due to the regulator device itself is avoided and interference during turn-on of the serially connected half wave rectifier (CR101, CR117) is also avoided.

As previously mentioned, the 2.1 volt regulator (CR114, CR115, CR116), which is conveniently placed in the drain of the transconductance regulator, provides soft regulated power to drive the diagnostic LED CR106 and the current setting series resistor R105.

In-rush protection for the switched mains 30, which is provided by the three parallel resistors R107, R108 and R112 and the relay K102 (FIG. 5B) whose normally open contact are connected across the paralleled resistors, is both controlled and energized by power supplied from the 24 volt regulator Q101 (FIG. 5A). Before the 24 volts DC output appears at the output of the transconductance regulator, the AC relay K102 which is set to close at 30 amperes is open and the 3.3 ohms from the parallelled resistors R107, R108 and R112 (which are each of 10 ohms) is placed in the path of current, charging the capacitor C104. As a result, the charging current is appropriately limited. Approximately 2 half cycles of 60 cycle power are needed to charge capacitor C104 to the DC operating potential. When the 30 KHz DC/AC converter 31 is energized the +24 volt bus on the Phase I/II board (which also operates the cooling fan 22) closes the contacts on relay K102 (FIG. 5B), shorting out the surge limiting resistances during normal continuous operation.

The charging energy for capacitor C104 is consistent with normal breaker I×I×T ratings and will not induce tripping of a properly rated breaker during start up. The control of the in-rush timing is dependent upon the +135 VDC bus WL116 reaching a level, exceeding the under-voltage supervision threshold at comparator U2B on the control board which conditions the IC U1 to allow the 30 KHz DC/AC converter 31 to turn on and energize the six-turn winding 62 (FIG. 3) supplying power to the 24 volt regulator. As will be explained, the IC U1 (FIG. 4B) tests the voltage of the positive DC bus on several closely spaced instants, which may cause some uncertainty in the moment that the DC to DC converter is turned on. The usual duration of the in-rush protection period, during which the relay K102 is open, is approximately 100 milliseconds.

The remainder of the circuit illustrated in FIG. 5A performs the functions of the Phase I/II Boost Doubler block 42 (FIG. 2) and includes a third diagnostic circuit. The block 42 functions include the voltage doubler which generates the 105 VDC Phase II energization, and lamp voltage responsive control logic which controls the application of the ignition pulse and the Phase II energization. The third diagnostic circuit provides an optical indication of the state of the doubler and the on or off state of the ignition control.

Phase II energization for the doubler and control logic is supplied via disconnects WL101 and WL102 as earlier noted. The voltage at disconnect WL101 is connected via a serially connected 120 ohm resistor R101 and 1 microfarad capacitor C101 to the input of a voltage doubler circuit to provide the −105 V Phase II boost voltage available at disconnect WL109 (FIG. 5A).

The voltage doubler, whose operation is controlled by transistor Q102, comprises a pair of diodes CR103 and CR104, the anode of diode CR103 and cathode of diode CR104 being connected together at the double input. The output of the doubler appears between the boost output terminal WL109 to which the anode of diode CR104 is connected, and the chassis ground. The cathode of diode CR103 which is connected via the control transistor Q102 to ground completes the doubler circuit. Capacitive energy storage at the input and at the output of the doubler is provided by the capacitor C101 and the output filter capacitor 21 respectively.

Boost operation of the doubler is controlled by power MOSFET transistor Q102 which is, in turn, controlled by the control logic (U103), a four comparator IC having the same pin diagram as U2 (FIG. 6B), in response to the voltage on the lamp. The power MOSFET Q102 may be one of several available types having large die and good heat dissipating T0220 cases, e.g. type IRF 830. The lamp voltage is sensed at disconnect WL109 which also supplies boost voltage to the lamp circuit.

The doubler control circuit is illustrated in FIG. 5A. The cathode of doubler diode CR103 is connected to the drain of power transistor Q102, the source of which is connected to ground. Thus, when transistor Q102 is not conducting, doubler action is prevented by opening the connection to ground via diode CR103. At most, with transistor Q102 not conducting, an undoubled negative going voltage will be coupled to the disconnect WL109.

The state of conduction of the boost control transistor Q102 is controlled by the voltage coupled to its gate through the control logic (U103A-D) in response to the voltage across the lamp. Voltage doubler operation is delayed during turn-on by comparator U103C until the voltage stored at the lamp terminals in capacitor 21 has reached 38 volts (or a higher setting depending upon the lamp requirements).

The gate control circuit for transistor Q102 comprises the voltage comparator U103C having the positive or non-inverting input at U103 pin 9 (see pin diagram U2, FIG. 6B) responding to a positive 12 volt reference voltage derived from the 24 volts DC supply by a first voltage divider R103A and R103B, and the negative or inverting input at U103 pin 8 (FIG. 6B) responding to a sensed voltage derived from the lamp and appearing in a second voltage divider R104, R103C. In particular, 22K ohm resistors R103A and R103B are serially connected in the order recited between the positive 24 volt bus and chassis ground. The resistor interconnection forming the voltage divider tap is connected to the comparator input at U103 pin 9. The 90.9K ohm resistor R104 and 22K ohm resistor R103C forming the second voltage divider are serially connected between the negative 105 V output bus of the voltage doubler at disconnect WL109 and the positive 24 volt bus.

The output at pin 14 of the comparator U103C is connected to a third voltage divider connected between the +24 V bus and chassis ground. The third voltage divider comprises the serially connected solenoid of relay K101, the 10K ohm resistor R102B and the 10K ohm resistor R102C. The comparator output and the gate of boost control transistor Q102 are connected to the voltage divider tap at the interconnection between the two 10K ohm resistors.

Doubler operation for Phase I/II operation of the lamp takes place in the following sequence: during a normal turn-on, the PWM control IC U1 (FIG. 4B) will be energized shortly after enabled, facilitating 30 KHz DC/AC operation in Block 32 (FIG. 2), and an AC voltage will appear in the six-turn winding 62 of power transformer T3 (FIG. 3) driving the 24 volt bus on the Phase I/II board (FIG. 5A) quickly to the 24 volt value. The lamp 44 (FIG. 2), not yet triggered, will be non-conductive and the main DC power supply (T3, CR201, L3 (FIG. 3)) will gradually charge the output capacitor 21 (FIG. 3) to a more negative value. Returning to FIG. 5A, the comparator U103C, which has its positive input terminal referenced to +12 volts and its negative input terminal at +24 volts (or some value slightly under 24 volts), will be conductive. Conduction by comparator U103C sets the voltage at its output to near zero, shorting the resistor R102C and holding the gate of Q102 at a near zero voltage and keeping transistor Q102 turned off and keeping the doubler turned off. However, as the voltage on the lamp begins to increase negatively the voltage at the negative input of comparator U103C begins to fall, thus reducing the positive difference in relation to the +12 volt reference. When the lamp voltage (at WL109) exceeds −38 volts, the two inputs coupled to the comparator go through a +12 volt equality and the comparator U103C turns off. This allows the voltage across R102C to go to approximately +12 volts and the gate of the doubler control transistor Q102 to go high, allowing conduction and doubler action to start. The doubler then generates energy at an output voltage nominally double that at its input, and charging output capacitor 21 toward 105 volts.

The doubler operation is discontinued and the trigger pulse to fire the lamp is generated by operation of relay K101 (FIG. 5A) when the doubler has charged the output capacitor 21 (FIG. 3) to approximately 105 volts. The circuit which senses this voltage involves the paralleled comparators U103A, U103B and U103D (FIG. 5A). The relay K101, as earlier stated, has its solenoid connected between the +24 V bus with its two series connected 10K ohm resistors R102A and R102C in the path to chassis ground. These resistors are large enough to prevent the relay from operating when they present the only path to ground for relay current. The comparators U103A, U103B, and U103D, which are paralleled to achieve greater current handling capacity, have their negative input terminals (at pins 4, 6 and 10 respectively) connected to chassis ground and their positive input terminals (at pins 5, 7 and 11 respectively (FIG. 6B) connected to the tap on the voltage divider R104, R103C (FIG. 5A). The outputs of the three paralleled comparators are connected at the interconnection between the solenoid of K101 and the resistor R102B. Should the comparators become conductive, the 10K resistors R102B and R102C will both be shunted by the now low resistance of the output stages of the three comparators and the relay K101 will operate to control the application of an ignition pulse from ignitor 43 (FIG. 2) to the lamp. At the same time, the low shunt impedance of the comparators also reduces the gate voltage on the boost control transistor Q102, turning it off and discontinuing further voltage doubling.

The output capacitor 21 (FIG. 3), however, is made large enough to store the requisite energy needed by the short-arc lamp for the usual glow to arc transition. After a successful ignition the lamp voltage falls 20 to 30 volts, well below the 38 volt threshold required to activate the doubler control circuit.

The blocks 32 and 38 in FIG. 2 convert the (±135 V to −135 V) DC energy from block 31 to a 30 KHz train of variable width square wave pulses 46 of alternating polarity at the output of block 32. The positive pulses have an amplitude of 270 volts and the negative pulses have an amplitude of −270 volts. As illustrated in FIG. 2, the pulses are referenced to zero volts and, while the leading edge of each pulse is illustrated as fixed, the timing of the trailing edge is variable. Supervisory control of the process is represented by the blocks 34, 35 36 and 37 (FIG. 2) (the high speed PWM IC U1) (FIG. 4B) and power feedback control of the process is represented by the blocks 37, 38, 39 and 40.

The blocks 32 and 33 include the power transistor bridge Q7-Q10 (FIG. 4C) and the gate drive transformer T1 (FIG. 4C) through which all supervisory controls act.

The supervisory and power feedback controls operate through a 16 pin integrated circuit U1 in block 37 (FIG. 2), manufactured by Unitrode and connected as illustrated in FIG. 4B. The IC U1 is of the UC 1825 series (2825, 3825) which is characterized as a high speed PWM (pulse width modulation) controller. The IC U1, whose pin diagram is provided in FIG. 6A, contains eight sections designed to provide the necessary control functions, which will be treated subsequently. The IC is energized by connection of pins 13 and 15 (Vcc) and pins 10 and 12 (GND) to a circuit which in the run state is supplied by a three-turn winding 63 (FIG. 3) on the main power transformer T3, coupled to the full wave rectifier CR10-13 (FIG. 4B).

The circuit diagram of the transistor bridge, which is a part of the control board 17, is illustrated in FIG. 4C. It consists of four type IRGBC40U insulated gate bipolar transistors Q7-Q10, converting DC power supplied from the AC/DC converter 31 to 30 KHz AC under control by the high speed PWM control network block 37 (FIG. 2) exerted through the gate drive transformer T1 in block 33 (FIG. 2).

The circuit of the transistor bridge Q7-Q10 is illustrated in FIG. 4C and is as follows. DC energy is supplied to the bridge from the +135 V and −135 V disconnects WL116 and WL117 (FIG. 5B) on the Phase I/II board 18 (FIG. 1). These are connected to the positive and negative disconnects WL3 and WL4 (FIG. 4C) on the control board respectively. The transistors Q7 and Q8 form a first serial pair and the transistors Q9 and Q10 form a second serial pair. Both serial pairs are connected between the +135 V bus connected to disconnect WL3 and to the −135 V bus connected to disconnect WL4 via a lower impedance center tapped one turn primary winding on a current sensing transformer T2. In particular, the collector of transistor Q7 is connected to the emitter of transistor Q8. The collector of transistor Q8 is connected to the B+ bus, and the emitter of transistor Q7 is connected to a first end of the primary winding of current transformer T2, the center tap of which is connected to the negative bus (WL4). Similarly, the collector of transistor Q9 is connected to the emitter of transistor Q10. The collector of transistor Q10 is connected to the B+ bus and the emitter of Q9 is connected to the second end of the primary winding of current transformer T2, the center tap of which is connected to the negative bus (WL4).

The gate drive transformer T1 has two primary windings (52 and 56) connected in parallel and driven from A and B output pins 14 and 11 of the PWM IC U1 (FIG. 4B). The primary winding 52 is associated with two secondary windings 53 and 54 for driving transistors Q7 and Q8. The winding 53 has its dotted terminal connected via current limiting resistor R22 to the gate and the undotted terminal connected to the emitter of transistor Q7. The winding 54 has its undotted terminal connected via current limiting resistor R23 to the gate and its dotted terminal connected to the emitter of transistor Q8. The primary winding 56 is associated with two secondary windings 57 and 58 for driving transistors Q9 and Q10. The winding 57 has its undotted terminal connected via current limiting resistor R25 to the gate and its dotted terminal connected to the emitter of transistor Q9. The winding 58 has its dotted terminal connected via current limiting resistor R24 to the gate and its undotted terminal connected to the emitter of transistor Q10.

The AC output of the transistor bridge appears between the interconnection of the collector of transistor Q7 and the emitter of transistor Q8, at the disconnect WL5, and the interconnection of the collector of transistor Q9 and the emitter of transistor Q10 at the disconnect WL6.

The primary winding of the main power transformer T3, (FIG. 3) which steps down the voltage prior to rectification and application to the arc lamp, is connected between the disconnects WL5 and WL6.

The transistors Q7-Q10 are controlled by the gate drive transformer T1 to switch in diagonal pairs to form the AC wave form 46 depicted in FIG. 2 as consisting of a sequence of 270 V (peak) pulses of alternating positive and negative polarity and, as will be explained, of variable duration under the control of the PWM network block 37 (FIG. 2).

The gate drive connections to achieve diagonal pair switching are shown in FIG. 4C. The primary windings 52 and 56 of the gate drive transformer T1 are of similar polarity, causing the polarities of the four secondary windings to have consistent polarity notations. Thus the undotted terminals of the secondary windings 53 and 58 are connected to the emitters of transistors Q7 and Q10 respectively and the undotted terminals of the secondary windings 54 and 57 are connected to the emitters of transistors Q8 and Q9 respectively. Thus transistors Q7 and Q10 of one diagonal pair conduct together and in alternation with transistors Q8 and Q9 of the other diagonal pair. Accordingly the terminal WL5 is momentarily positive at +135 volts and the terminal WL6 is momentarily negative at −135 volts when the diagonal transistor pair Q8 and Q9 are conductive. Similarly, the terminal WL5 is momentarily negative at −135 V and the terminal WL6 is momentarily positive at +135 V when the diagonal pair Q7 and Q10 are conductive. Thus a 270 volt AC waveform 46 (FIG. 2) of alternating polarity is supplied to the primary 60 of the power transformer T3 (FIG. 3).

The gate drive transformer T1 (FIG. 4C) is designed for 30 Khz pulse operation. It has a toroid core of approximately one-half inch OD, one-quarter inch ID dimensions and is made of 3E2A material available from Philips.

The ferrite core of the transformer T1, although in fact a toroid, is illustrated in FIG. 4B by two symbols for unconnected core segments 51 and 55 and a physical segregation of the windings into two sets of three. The illustration is justified in that air coupling achieved by greater turns proximity groups the six windings into two virtual sets of three windings as illustrated.

The windings 52, 53, 54 associated with the upper core symbol 51 are, in fact, closely air-coupled by being wound as adjacent wires in a single continuous flat six-filer winding which makes up the complete transformer T1. Similarly, the windings 56, 57 and 58 associated with the lower core symbol 55 are closely air-coupled by being wound as adjacent wires in the same single continuous flat six-filer winding. As illustrated by the numbers on the transformer terminals P1 to P12, the first six terminals (P1 to P6) are assigned consecutively to the dotted ends of the six windings in order across the flat six-filer winding, and the second six terminals (P7 to P12) are assigned consecutively to the undotted ends of the six windings in order across the flat six-filer winding. For close air coupling, the dotted end of the primary winding 52 at pin P2 is placed between the dotted end of the secondary winding 54 at pin P1 to one side and the dotted end of the secondary winding 53 at pin P3 to the other side in the six-filer winding. After 25 turns of the six-filer winding, the undotted end of primary winding 52 appears at pin P11, with the undotted end of the winging 53 to one side of pin P10 and the undotted end of winding 54 to the other side at pin P12. Thus the two secondary windings 53 and 54, being in adjacent positions to the primary winding 52 in the six-filer winding, and separated only by a few thousands of an inch of insulation, are in fact closely coupled as implied by the illustration, which groups windings 52, 53 and 54 in one set of three windings.

Similarly, and in order to achieve close coupling, the dotted end of the primary winding 56 at pin P5 is placed between the dotted end of its secondary winding 57 at pin P4 to one side and the dotted end of the secondary winding 58 at pin P6 to the other side in the six-filer winding. After 25 turns the undotted end of primary winding 56 appears at pin P8 with the undotted end of the winding 58 to one side at pin P7 and of winding 57 to the other side at pin P9. Thus the two secondary windings 57 and 58, being in adjacent positions to the primary winding 56, are closely coupled thereto as implied by the illustration which groups the windings 56, 57 and 58 into a second set of three windings. Adjacencies also exist between secondary windings but produce no particular disadvantages.

The transformer T2 (FIG. 4C), whose center tapped primary winding is coupled in the emitter to ground path of one transistor in each diagonal pair, is a current transformer, having a single center tapped primary winding and a 200 turn secondary winding. The multi-turn secondary reflects the current flows in both diagonal transistor pairs and thus senses all of the output current supplied to the primary winding 60 of transformer T3 in the magnetics sub-assembly (FIG. 3). In the magnetics sub-assembly 30 Khz pulses of alternating polarity are rectified to DC for energization of the short arc lamp 44. The secondary winding of current transformer T2 is connected to a full wave rectifier CR6–9 which derives a DC quantity providing a lamp current dependent input to the power calculation network 40 (FIG. 2). When a lamp voltage dependent input is supplied to the network 40, whose circuit diagram is provided in FIG. 4B, the network can synthesize a lamp power dependent output quantity and that quantity may be used for PWM control of the output power of the power supply.

As earlier stated, the output of the 30 KHz DC/AC converter 32 (FIG. 2) is connected to the primary winding 60 of the power transformer T3 in block 38 which, through its secondary windings 61, 62, 63, supplies PWM controlled phase III run power to the arc lamp 44, power to the doubler for Phase II, glow to arc transition to the arc lamp and a sense voltage proportional to the lamp voltage for application with the current dependent quantity derived from current transformer T2 to the power calculation network 40. A circuit diagram of the magnetics sub-assembly and the output filter capacitors, which constitute the contents of blocks 38 and 41, is provided in FIG. 3.

The power transformer T3 is a step-down transformer designed to step down the 270 volt pulses of alternating polarity applied to its primary winding 60 by an amount dependent upon a 7 to 1 turns ratio to obtain from its secondary winding 61 a filtered DC output voltage of from 20 to 30 volts, the output voltage also being dependent on the PWM duty cycle.

The power transformer's construction and connections are shown in FIG. 3. The primary winding 60 is 21 turns of 7 strand Litz wire paralleled four times. The center tapped secondary winding 61 is 6 center tapped turns of 513 strand Litz wire paralleled eight times. The secondary winding 61 is connected in parallel with a secondary snubber 47 consisting of capacitor C201 in series with a pair of mutually paralleled resistors R201 designed to reduce high frequency transients. The transformer windings are on a ferrite core having a small air gap designed to postpone saturation and reduce core walk.

The anodes of the rectifier pair CR201 are connected to the two ends of secondary winding 61 for full wave rectification. The cathodes of the rectifier pair are connected together and to the positive terminal of the output filter capacitor 21. The center taps of the eight paralleled six-turn windings are connected to one terminal of the output filter choke L3. The other terminal of the output filter choke is connected to the negative terminal of the output filter capacitor 21. The lamp run (Phase III) energization is derived from the secondary winding 61 and the rectifier/filter circuit just described.

Referring to the block diagram of FIG. 2 and the circuit diagram of FIG. 3, the lamp run energization derived from secondary winding 61 of power transformer T3 is conventionally supplied via an igniter 43 to the arc lamp 44. FIG. 3 also shows two additional secondary windings on transformer T3. The six-turn secondary winding 62, also of Litz wire, which is coupled to disconnects WL101 and WL102 on the Phase I/II board 18 energizes the doubler circuit which provides Phase II or glow to arc transition energy to the arc lamp, as earlier discussed. The three turn secondary winding 63 (also of Litz wire), which is coupled to the disconnects WL1 and WL2 on the control board, supplies a lamp voltage sensing quantity which is combined with the lamp current sensing quantity in the power calculator network block 40 (FIG. 2) as will be explained.

The circuit of the remainder of the control board is illustrated in FIGS. 4A and 4B. FIG. 4B illustrates the circuitry used to implement the high speed PWM control block 37 including the PWM IC U1 responding to calculated lamp power and the optically isolated power setting function of block 36. FIG. 4A illustrates the circuitry used to implement the supervisory functions of over-temperature, and mains under voltage in the supervision block 35 and the optically isolated enable function of block 34. All the above blocks are found in FIG. 2.

The PWM IC U1 is a 16 pin IC designed to provide the control functions essential to a DC to AC conversion in which pulse width modulation is used to adjust an output quantity to a reference quantity, as shown in FIG. 4B.

The IC U1 is a high speed controller (1825) capable of operation at switching speeds substantially in excess of the 30 kilohertz switching rate herein employed. A user's logic diagram of the IC, numbers 1825 and 1846, is provided in the Unitrode Linear Integrated Circuit Data and Applications Handbook, printed April 1990 on pages 4-120 to 4-126 and 4-172 to 4-178, which pages are hereby incorporated by reference. The connection diagram for the IC U1 is provided in FIG. 6A. In that diagram, pin numbers (1–16) are provided with an abbreviation of the function that each pin is associated with.

The IC U1 may be regarded as an eight section device for applications purposes. Each section is designed for incorporation into a pulse by pulse current mode PWM operated DC to DC power system subject to degenerative feedback control. The output quantity subject to control may be output current, current and voltage, or power. The 16 pins provide necessary external connection to the IC's internal sections.

The "error amplifier section of IC U1", which is connected in the primary power controlling feedback path, is a differential amplifier, subject to an inhibit control, having an inverting input for applying an output dependent quantity to "INV" pin 1, a non-inverting input for applying a reference quantity to "N.I." pin 2. Pin 2, which is at a nominal +5 volts, acts as a reference to pin 1 and also responds to the optically isolated power cutback from block 36, which may electronically lower the reference to as little as +2.5 volts. An internal output of the error amplifier is coupled to the PWM comparator section to "time-out" an externally generated ramp. An external output of the error amplifier appears at "E/A OUT" pin 3 for providing an external negative feedback path. The inhibit control responds to an internal signal from the under-voltage lockout section and to an external signal externally applied to soft start pin 8.

The "output section" of the IC U1 is in a "totem pole" configuration which supplies a pulse width modulated wave signal to "OUT A" at pin 11 and "OUT B" at pin 14. The output section may be shut down by a signal from the under voltage lockout section, the current limit shut down section or the soft start section.

The power for operation of the IC U1 is coupled between "Vc" and "Vcc" pins 13 and 15, which are usually connected together externally, and "GROUND" and PWR GND" pins 10 and 12, which are also usually connected together externally. (Within the IC the pins 15 and 13 are connected to the logic portion and to the power section Vccs respectively, while the pins 10 and 12 are connected to the logic and to the power section ground respectively.)

The "under voltage lockout section" of the IC U1 senses the voltage available at the IC at "Vcc" pin 15 and compares it with hysteresis to an internal 9 volt reference to determine under-voltage. When an undervoltage occurs, the under-voltage circuit shuts down the IC output at pins 11 and 14, operates the inhibit control of the error amplifier, and turns off the 5.1 volt reference regulator at pin 16.

The "oscillator section" of the IC U1 consists of an RC oscillator which generates a clocking pulse for setting the pulse repetition rate. The oscillator operation is determined by an external capacitor connected to "CT" pin 6 which determines the "dead time" and by an external resistor connected to "RT" pin 5 which determines the oscillator frequency. The clocking pulse is supplied to "CLOCK" pin 4.

The "PWM comparator section" of IC U1 responds to an externally generated ramp coupled to "RAMP" pin 7 and to an internal error amplifier output accessible at pin 3.

The "soft start section" has an external connection at "SOFT START" pin 8 to cause the pulse width modulator to generate pulses of minimum duration during start-up, thereby effecting a low power "soft start" for the power supply.

The "current limit/shut down section" of IC U2 has an external connection at ILIM/SD pin 9. It has two internal thresholds, one at 1.0 volts which turns off the PWM comparator section if the limit is exceeded, and another at 1.4 volts which not only shuts down the output but also forces the controller to recycle through a soft start upon re-start.

The "voltage reference section" of IC U1 is a band gap regulator connected to 5.1 V REF pin 16, available for external use. If the reference falls below 4 volts, the error amplifier section and output amplifier section are inhibited to shut down the IC's output.

The energy to start the IC U1 is derived from the 60 Hz AC/DC converter block 31 (FIG. 2) while the energy to permanently or normally run the IC U1 comes from the 30 KHz DC/AC converter block 32 via the V sense winding 63 on transformer T3 (FIG. 3). The sense winding 63 also provides DC power to the other circuits requiring power on the control board.

The circuit for supplying starting energy to IC U1 is shown in FIGS. 4A, 4B and 4C. The Vcc pins 13 and 15 of the IC U1 receive starting current via an 82K ohm resistor R5 (FIG. 4B) connected to the positive bus at disconnect WL3 (FIG. 4C). The ground pins 12 and 10 of the IC U1 are connected via a 1.0K ohm resistor R20 (FIG. 4A) to the negative bus at disconnect WL4 (FIG. 4C). Resistor R20 is shunted by an 0.1 microfarad capacitor C13 (FIG. 4A), providing time delay. A 22 microfarad capacitor C4 (FIG. 4B) (also providing time delay) is connected between the Vcc and ground pins. When the Vcc voltage reaches approximately 9.2 volts, which occurs in about five and one half cycles of the 60 Hz waveform, as capacitor C4 is being charged through resistor R5, the IC turns on the internal IC functions.

The V sense winding 63 on power transformer T3 (FIG. 3) serves multiple purposes, providing operating power for the circuits on the control board as well as supplying a voltage proportional to the lamp voltage for run mode (Phase III) power regulation. The sense winding 63 supplies energy in the form of a succession of pulses of alternating polarity. The control board circuits receive 12 volts operating potential and require approximately 40 milliamperes of current.

The circuit for supplying normal run energy to the control board is shown in FIG. 4B. The three-turn winding 63 on the power transformer T3 is connected to disconnects WL1 and WL2 on the control board 18, which are in turn connected to the AC input terminals of diode bridge CR10–13. The DC output terminals of the diode bridge are connected via a novel transconductance voltage regulation circuit comprising diode CR5, resistor R9, MOSFET transistor Q5, and Zener diode CR4 to the Vcc pins of the IC U1. The positive output terminal of the diode bridge CR10–13 is connected to the anode of isolating diode CR5, whose cathode is connected to the drain of the MOSFET power transistor Q5, which provides regulation by control of its transconductance. The cathode of diode CR5 is also connected via 22K ohm (Zener current supplying) resistor R9 to the gate of transistor Q5, the gate also being connected via 15 volt Zener diode CR4 to ground. The source of transistor Q5, at which a regulated 12 volt output appears, is connected to the Vcc pins 13 and 15 of the IC U1.

Normal run energy is supplied to the control board when DC to AC conversion is taking place in blocks 32, 38 (FIG. 2) which energizes the sense winding 63 in power transformer T3 (FIG. 3).

The power supplied by winding 63 for operating the control board is approximately a half watt of power, conveniently extracted from the 2 kilowatts of 30 Khz pulsed power available in the power transformer T3. The power that is supplied to the control board must be transient-free to avoid unreliable operation or possible damage as was the case with the somewhat higher power provided to the Phase I/II board. Accordingly, a transient suppressing novel transconductance regulator is required. Because of the lower current requirement, the transconductance regulator Q5 on the control board does not require an input LC filter to suppress transients in the incoming energy, and the 22 microfarad filter capacitor C4 provides all the necessary filtering.

The dependence of conduction by the Q5-CR4 regulator upon control of the Vgs voltage provides the basis for the term "transconductance regulator" herein used to describe the regulation on the Phase I/II and control boards. Both regulators provide energization regulated to within a fraction of a volt and both provide energization free of transients that would accompany the use of a conventional capacitor input peak rectifying regulator deriving energy from a 30 Khz, low impedance source.

The supply of regulated, transient free Vcc energy to the IC U1 also energizes the IC U1's 5.1 volt band gap reference which supplies energy to the supervision block 35, including the four section comparator IC U2 (FIGS. 4A, 4B), the enable opto-coupler U4 (FIG. 4A) and power cutback opto-coupler U3 (FIG. 4B).

The normal start-up of the power supply, once the 60 Hz AC/DC converter block 31 is functioning, next involves starting the IC U1. The IC U1 is started via Vcc energization supplied by current which flows through 82K ohm resistor R5 (FIG. 4B) connected to the +135 VDC bus at control board disconnect WL3 (FIG. 4C). The current charges capacitor C4, (FIG. 4B) the voltage resulting from the stored charge supplying Vcc potential to the IC U1. When the Vcc reaches approximately 9.2 volts (plus or minus 0.4 volts) all functions within the IC are turned on. Assuming no inhibition by the supervision (e.g., enable off, etc.) the A and B outputs of the IC appear, the DC to DC converter blocks 32, 38, 41 runs and the V sense winding 63 on transformer T3 (FIG. 3) provides 12 VDC energy to the IC U1.

The term "bootstrap" may be used to described the use of energy from the DC to DC converter blocks 32, 38, 41 to operate the IC U1, operation of the IC U1 being essential to generation of the DC to DC converter. If the DC to DC converter is not running it cannot be started because there can be no gate drive from the IC U1 for operating the transistor bridge. The term "boot" may be used to describe the kick given to the system to get it started. The "boot" is provided by the capacitor C4 (FIG. 4B), connected to the Vcc terminals charged by current supplied via resistor R5 from the 60 Hz AC/DC converter 31 (FIG. 2). If the converter 31 is energized, the capacitor C4 provides enough energy to turn on the IC U1 and initiate operation of the DC to DC converter, but that operation will only be sustained for the expected starting time. As will be described, the 60 Kz AC/DC converter 31 may be arranged to be energized when the host equipment for the power supply is first turned on. Assuming enabling is not defeated by a closed SW101 (FIG. 5B), the starting sequence will begin with the charging of capacitor C4. This manner of starting may be characterized as an "automatic boot".

The supervision block 35 of FIG. 2 performs the function of responding to an over-temperature condition within the power supply, to an under-voltage condition on the switched mains, and to logic level commands from the enable opto-coupler U4 in block 34.

The output of the two blocks 34 and 35 is coupled to the soft start pin 8 of the IC U1 (FIG. 4B) which, when at ground potential, acts within the IC to "inhibit" the operation of the internal error amplifier, reducing the pulse width to zero and preventing the generation of the gate drive necessary to operate the DC to DC converter. When pin 8 on the IC U1 goes positive, then operation of the internal error amplifier may proceed and the DC to DC converter allowed to operate. The supervision block 35 receives its energization from the 5.1 volt reference on pin 16 of the IC U1 referenced to IC ground pins 10 and 12 (FIG. 4B).

The circuit diagram of blocks 34 and 35, which will be treated together, is provided in FIG. 4A. The blocks 34 and 35 consist of an integrated circuit U2 containing four comparators of which three (U2A, U2B, U2C) are used for the supervisory and enable functions, an optocoupler IC U4 for input of the enable signal, plus resistors and capacitors. The comparators are of the open collector design. The pin diagram of IC U2 is provided in FIG. 6B.

The over-temperature control responds to the air temperature passing over the control board and thus responds to a failure of the fan 22 (FIG. 1A), a blockage of the ventilation, or to the placement of the power supply in an unusually hot environment. The over-temperature control utilizes the comparator U2A. The IC U2 has its Vcc pin connected to the 5.1 volt reference bus at pin 16 on the IC U1 and its ground pin 12 connected to ground. This energizes all four comparators. The non-inverting (+) terminal 5 of comparator U2A is connected to a first voltage divider consisting of 2.2K resistor R13B, 2.2K resistor R13C, and 2.2K resistor R13D, connected in the order recited between the 5.1 V bus and ground, at the connection between R13B and R13C which provides a +3.4 volts DC potential. The inverting input terminal at pin 4 of comparator U2A is connected to the tap on a second voltage divider consisting of a negative temperature coefficient resistor RT1 and resistor R18, connected in the order recited between the 5.1 V bus and ground. The values of resistor RT1 and R18 are selected to give over-temperature protection to the power supply and are typically set to "shut down" power supply at 65 degrees Centigrade via soft start pin 8 on IC U1. At air temperatures cooler than 65 degrees Centigrade the voltage on pin 4 is set to be less than 3.4 volts, keeping the output of the comparator in the "off" state, with the open collector providing an open connection to pin 8 on IC U1. Assuming that comparator U2B is in a similar "off" state, the only element tied to pin 8 is the 470 picofarad capacitor C6 (FIG. 4B) used to provide a short delay to any change in state. Should the air temperature exceed 65 degrees Centigrade, the negative temperature coefficient resistor RT1 falls in value and the voltage on the inverting pin 4 rises to a value in excess of 3.4 volts, causing the output of the comparator to go to ground potential. When this happens the soft start pin 8 of IC U1 is taken to ground potential and the power supply is shut down.

The mains under-voltage control in supervision block 35 responds to an approximately 180 VAC low line condition at the switched mains 30 (FIG. 5B). Referring to FIG. 4A, the under-voltage control utilizes the comparators U2B and U2C, both of which are also utilized for the enable function. The non-inverting input at pin 7 of comparator U2B is connected to the +3.4 V tap on the first voltage divider (R13 B,C,D). The inverting input pin of comparator U2B is connected to a third voltage divider comprising a 2.2K resistor R13A, resistor R19, the output terminals 5 and 4 respectively of the opto-coupler U4, and a 1.0K ohm line voltage sensing resistor R20. The foregoing components are connected in the order recited between the 5.1 volt bus and ground. Resistor R20 is shunted by a 0.1 microfarad capacitor C13, designed to reduce the rate of change of the voltage drop across resistor R20. The opto-coupler U4 consists of a light emitting diode, connected between disconnects WL9 and WL10, which is designed to generate light when a logic level signal is coupled to the disconnects, and a light responsive NPN transistor arranged to be illuminated by the LED when a logic level "high" signal is coupled between the disconnects. Assuming that the opto-coupler U4 is on, the PNP transistor in the opto-coupler is conductive and current may flow into the collector and out of the emitter with little resistance, completing the current path through the third voltage divider between the 5.1 V bus and ground.

Continuing with reference to FIG. 4A, resistor R20 is connected to sense line voltage at the switched mains 30 by connecting it in the path of current supplied to the control board circuitry through resistor R5 (FIG. 4B). The DC output of resistor R20 is assumed to be proportional to the line voltage. The terminal of resistor R20 connected to the emitter at pin 4 of the opto-coupler of U4 is also connected to the negative bus on the control board leading to WL4 (FIG. 4C). Thus a path for current through resistor R20 is provided which, starting at the positive +135 VDC bus at control board disconnect WL3 (FIG. 4C), includes in order the 82K ohm resistor R5, the control IC U1 (FIG. 4B) via Vcc pins 13, 15 to ground pins 10 and 12 via the ground to the ground terminal of R20, and finally through R20 to the negative −135 VDC bus at disconnect WL4. This path allows current to flow in resistor R20 proportional to the voltage between the positive and negative busses connected to disconnects WL3 and WL4. The drop across the IC U1 is both negligibly small and constant, and, once taken into account, does not affect the under-voltage setting. The current in this path causes a few volts drop in R20, proportional to line voltage which places a negative voltage across resistor R20 in relation to ground, and which reduces the voltage at inverting input pin 6 of comparator U2B in relation to the +3.4 volt setting on the non-inverting input pin 7. In the event that the line voltage is too low the negative voltage at the inverting input of U2B attributable to current in R20 is reduced and, assuming that the drop is adequate to cause the potential on inverting pin 6 to exceed that on pin 7, the comparator goes into an "on" state, grounding the soft start pin 8 on IC U1 and leading to shut down of the power supply. If the negative voltage in mains voltage sensing R20 remains high, the comparator sees a more negative voltage on the inverting pin 6 in relation to that on non-inverting pin 7 and the comparator is kept off, allowing normal operation.

Continuing with reference to 4A, the under-voltage comparator U2B is accomplished by a second hysteresis supplying comparator U2C, having its inverting input pin 8 connected to the output pin 1 of U2B and its non-inverting input pin 9 connected to the interconnection of 2.2K resistors R13C and R13D. This sets a +1.7 volt bias on the non-inverting input pin 9. The output of comparator U2C at pin 14 is connected through 33K ohm resistor R17 to the inverting pin 6 on comparator U2B.

The values of threshold setting resistance R19 and hysteresis setting R17 are established empirically. The resistance values are set to shut down the power supply when the line voltage falls to approximately 180 volts. The designed hysteresis introduced by U2B is 9 to 10 volts. In a normal turn-on sequence, turn-on is permitted when the power supply is unloaded at 180 volts at the mains and the under-voltage sensor will turn off the power supply when the power supply is loaded and the voltage at the mains falls to 175 volts.

The enable control utilizing opto-coupler U4 allows automatic "bootstrap operation". As shown in FIG. 4A, the output contacts of opto-coupler U4 are connected in the serial path between the inverting pin 6 on the comparator U2B, the negative bus at WL4, and via resistor R20 to ground. When the opto-coupler is turned "on" by a "high" logic level signal coupled across the internal light emitting diode, the light sensitive transistor of the opto-coupler becomes conductive and, if the mains are above the under-voltage threshold, evidenced by a suitably large voltage drop in resistor R20, the DC to DC conversion is enabled to start up. Start-up occurs in a short sequence initiated with energization of the switched mains 30, which turns on the 60 Hz AC to DC converter 31, which provides the "automatic boot" feature mentioned earlier.

In the event that the enable control is off, the voltage drop attributable to the resistor R20 is removed from the inverting pin 6 of comparator U2B, causing the voltage on pin 6 to assume a higher value than the voltage on pin 7 and turn on the comparator U2B, connecting the soft start pin of IC U1 (FIG. 4B) to ground and preventing operation of the DC to DC converter. In the event that the input logic level falls to zero while the power supply is operating, the DC to DC converter will also be shut down.

The power calculation block 40 (FIG. 2) utilizes the IC U1 and circuitry in FIGS. 3, 4B and 4C. The error amplifier section of IC U1, whose output control the PWM comparator section of the IC U1 to control the output power of the power supply, is supplied with an output power-dependent quantity derived from a current-dependent quantity supplied by current transformer T2 (FIG. 4C) and from a voltage dependent quantity derived from the sense winding 63 on the step-down transformer T3 (FIG. 3). The two sensed quantities are combined in power calculation network 40 which provides a power dependent quantity to the error amplifier INV pin 1 of IC U1. A fixed threshold from the 5.1 volt bus may be applied to non-inverting input pin 2, or the "power cutback" control, including opto-coupler U3 (FIG. 4B), may adjust the bias to approximately +2.5 volts. The output of the error amplifier section is coupled internally to control the PWM comparator section for power regulation and appears at E/A OUT pin 3 of IC U1, where it is connected in a degenerative feedback network back to INV pin 1.

The circuit connected to the error amplifier section of IC U1 is illustrated in FIGS. 4B and 4C. The secondary winding of the current transformer T2 (FIG. 4C), which supplies current substantially proportional to the pulsed current flowing in diagonal transistor pairs (Q7, Q10, Q8, Q9) to provide primary current to power transformer T3, is connected to the AC input terminals of rectifier bridge CR6-9. The negative DC output terminal of the bridge is connected to ground (FIG. 4B). An adjustable shunt resistor R7 (FIG. 4B) (a first component in the power calculation block 40) is connected between the positive and negative DC output terminals of the bridge. The adjustable resistor R7 consists of a set of 3.3K ohm resistors in a straight in-line package which may be selected to produce the desired current scale factor and, in particular, to produce a near +5.1 volts at INV pin 1 from a +12 to +14 volts DC potential established by the shunt resistance at the positive DC terminal of rectifier bridge CR6-9 with respect to ground.

The voltage appearing at the positive DC output terminal of rectifier CR6-9 from the current transformers is used not only in the power calculation pursuant to power regulation but, as will be explained, also for sensing over-current by a connection to ILIM/S.D. pin 9 and for supplying current to generate the ramp by a connection to RAMP pin 7 of IC U1.

The DC output terminal of rectifier CR6-9 is connected as shown in FIG. 4B for purposes of power regulation to the anode of isolating diode CR3 (FIG. 4B) whose cathode is connected via 750 ohm resistor R10 to one terminal of 0.047 microfarad capacitor C7, the other capacitor terminal being connected to ground. Additional components of the power calculation block 40 include a voltage divider consisting of two serially connected 4.7K ohm resistors R11C and R11B which shunt the capacitor C7. At the tap on the voltage divider R11B, R11C a voltage proportional to the power supply output current of approximately 5.1 volts appears. The tap is connected via a 22K ohm resistor R9D to the INV pin 1 of the error amplifier of the IC U1. The rectifier CR3, capacitor C7 and resistors R11B and R11C peak rectify the fluctuating voltage appearing at the rectifier output with a time constant (442 microseconds) selected to hold up the voltage at the tap, even though the input wave form may be a series of spaced short duration pulses. These circuit elements cause the primary current sensed by the current transformer T2 (FIG. 4C), which is not continuous, to emulate the rectified current, supplied by the secondary winding 61 of the power transformer T3 (FIG. 3) and flowing in the filter choke. The rectifier CR3 performs a similar function to rectifier CR201 (FIG. 3) in the magnetics subassembly and could be replaced with other decoupling means such as a transistor. The capacitor C7 is used to store energy between pulses of primary current in a similar manner to the storage of energy between pulses of secondary current by the filter choke L3 (FIG. 3). The resulting wave shapes are comparable and have similar slopes. This technique permits one to sample discontinuous primary transformer current and yet obtain an accurate measurement of the continuous rectified current flowing in the choke and, after filtering, into the arc lamp load 44.

The circuit (CR3, R10, C7, R11B, R11C, R9A,B) (FIG. 4B) also isolates the voltage appearing at the tap between R11B and R11C, which represents sensed current, from fluctuations introduced at pin 7 of IC U1 as a result of generation of the ramp. The value of resistor R10 is selected in respect to the line voltage to maintain constant power. The voltage sense winding 63 on the power transformer T3 (FIG. 3) provides a voltage for power calculation in Block 40. The voltage sense winding 63 senses the voltage on the core of T3 resulting from reversing the sense of the connections of the primary winding 60 between the +135 VDC and −135 VDC busses. The voltage in the secondary winding 61, from which load current is extracted, approximates the voltage across the primary reduced by the turns ratio, since they are linked by common flux. Similarly, the resulting voltage in the secondary winding 63, which is lightly loaded, is linked to the same flux and also produces a voltage which approximates the voltage across the primary reduced by the turns ratio. There are small differences between the sensed voltage and the voltage on the loaded secondary 61, to wit: IR drops in the secondary copper and leakage inductance drops in the secondary magnetic structure. In addition, there is a drop in rectifier diode CR201 which is approximately 0.8 volts. These drops are small, tend to be constant under nominal load, and can be calibrated out. Accordingly, the voltage in sense winding 63 is suitable for the load power calculation when combined with a current emulating the secondary current in L3 as discussed. The winding 63 is connected via disconnects WL1 and WL2 to the AC input terminals of bridge rectifier CR10-13, as earlier stated. As shown in FIG. 4B, the DC output terminals of the rectifier CR10-13, the negative terminal of which is connected to ground, are shunted by a voltage-scaling adjustable resistor R16 forming a further component of the power calculation block 40. The adjustable resistor R16 has a fixed tap and is connected to ground through resistor R15. The tap is connected via 2.2K resistor R13E to one terminal of 0.1 microfarad filter capacitor C12, the other terminal of the capacitor being grounded. The ungrounded terminal of capacitor C12 is then connected via 22K ohm resistor R9E to the inverting pin 1 of the error amplifier of IC U1. The rectifier output of nominally 25 volts DC is divided down by the voltage-scaling voltage divider to provide a voltage responsive quantity approximately equal to the 5.1 voltage reference which, as earlier noted, is applied to N.I. pin 2 of IC U1 (unless the power cut back control U3 is enabled). The capacitor C12 eliminates short term fluctuations from the sensed voltage.

Referring to FIG. 4B, the error amplifier's external degenerative feedback path includes 0.022 microfarad capacitor C10, 220 picofarad capacitor C11, and 22K ohm resistor R9C which also provides feedback to hold the output at E/A OUT pin 3 of IC U1 to approximately 5.1 volts. For controlling higher frequency transients at the output of the error amplifier section a 220 picofarad capacitor C9 is provided which is connected between E/A OUT pin 3 and the RAMP pin 7 of IC U1.

Under the above circuit conditions, where the quantity representing current in the power transformer primary 60 and the quantity representing voltage across the power transformer primary are substantially equal, then, with an appropriate scale factor, their sum, assuming small changes in either quantity, will accurately represent the input power supplied to the transformer primary. It may be shown that a 10% variation in either input quantity will produce only a 1% error in the power calculation and that a 20% variation in either input quantity will produce only a 4% error in the power calculation. Accordingly, the power calculation provides excellent accuracy. While the algorithm employed is well known, the use of the primary current and primary voltage in the power transformer to measure the power supplied to the arc lamp load, as herein described, is novel.

The opto-coupler control 36 (FIG. 2) is provided to cut back the power output of the power supply. The power cutback control includes a circuit on the control board which requires the application of a control signal at the modest power of a logic level output and a circuit on the Phase I/II board which optionally supplies the control signal and connections to passive means of power adjustment.

As shown in FIG. 4B, the power cutback control circuit on the control board includes the opto-coupler U3, containing an LED and an optically sensitive PNP, a 470 picofarad capacitor C14 connected between the base and emitter of the included NPN, a 47,000 picofarad capacitor C15 connected between collector and emitter and a 4.7K ohm resistor R11 connecting the collector of the NPN to the N.I. pin 2 of the IC U1.

The LED in opto-coupler U3 has its anode and cathode connected respectively to the disconnects WL7 and WL8 on the control board for connection to the disconnects WL107 and WL105 (FIG. 5A) on the Phase I/II board. As shown in FIG. 5A, the Phase I/II board includes a bus providing 24 volts DC and a 10K ohm resistor R102A for establishing a maximum LED current. The resistor R102A is connected between the 24 volt bus at disconnect WL103 and disconnect WL107. Disconnect WL105 is connected to ground, completing the circuit. Disconnects WL108 and WL107 are connected together and disconnects WL106 and WL105 are connected together.

The current supplied to the LED in opto-coupler U3 via the two sets of disconnects WL7, WL8 (FIG. 4B), WL107, WL105 (FIG. 5A) may be passively adjusted by a variable resistance (not illustrated) connected between disconnects WL108 and WL106, which are in parallel with disconnects WL107 and WL105. A reduction in the resistance between disconnects WL108 and WL106 thus reduces the current available to the LED, reducing its light output and thereby the conductance of the optically sensitive NPN in opto-coupler U3. The optically sensitive NPN transistor, as already noted, is connected between the N.I. pin 2 of the IC U1 and ground and thus, depending on its conductivity, may be used to lower the 5.1 volt B+ bias normally at that pin. The opto-coupler U3 may be operated in an analog or on/off fashion, with the limits being set either by the selection of R102A (FIG. 5A) or R11 (FIG. 4B). In either event, the power cutback control 36 acts to reduce the threshold in the E/A amplifier of IC U1 and in the sense to cut back the maximum available power by shortening the duty cycle of a PWM pulse. The available range of power adjustment is a function of the resistance values and may be cut back from full power to one quarter power.

A further control in the supervision block 35 is applied to prevent an undesired increase in the output voltage of the power supply in the event of lamp failure causing the load current to go to zero. The control circuit, which is shown in FIG. 4B, includes the NPN transistor Q6 whose emitter is connected via diode C14 and via current supply resistor R9D to the INV P1 on the IC U1. The emitter of Q6 is also connected to ground via 2.7K resistor R21. The base of Q6 is connected to the N.I. pin 2 of the IC U1 and its collector is connected to the 5.1 volt reference pin 16.

The transistor Q6 circuit acts as a current 'peg' to set a minimum sensed current limit, substituting a current supplied by Q6, when the sensed load current has in fact gone to zero. The effect is to prevent the output voltage from going to high in the vent the lamp goes off.

The current peg is set at one and a half volts (2 diode drops) below the 5.1 volt reference voltage. If the reference is cut back by the power cutback control U3, the current peg is still at one and a half volts below the reference. When the one and a half volts is exceeded by extinction of the voltage representing sensed current, an artificial voltage representing sensed current is supplied by Q6 to INV pin 1.

Accordingly, the artificial voltage representing sensed current is combined with the voltage representing sensed voltage at the INV input, so as to allow the normal power calculation network to respond to voltages and prevent the output voltage from becoming excessive.

The second use of the rectified output of the current transformer T2 (FIG. 4C), which appears as a voltage across the shunt R7 (FIG. 4B), is for over-current sensing. The positive DC output terminal of the rectifier CR6-9, at which 12-14 volts DC appears at normal lamp current levels, is connected via 3.3K ohm resistor R6 to the I LIM/SD pin 9 of IC U1. Pin 9 is also connected via a filter comprising a 220 picofarad capacitor C3 shunted with a 220 ohm resistor R8 to ground. The resistors R6 and R8 step down the voltage representing current applied to pin 9 to approximately 0.9 volts which is suitable for comparison with the internal 1 volt and 1.4 volt references of the IC U1's current limit control. The filter capacitor C3 reduces undesired response to transients. When the first current threshold (i.e. 1 volt) is exceeded the PWM comparator section is shut down and if the second current threshold (i.e. 1.4 volts) is exceeded the supply returns to a soft start with minimum PWM pulses.

The third use of the rectified output of the current transformer T2 (FIG. 4C) is to supply energy to generate the ramp used to time PWM operation. As shown in FIG. 4B the connection is made via 44K ohm capacitor charging or "ramp resistor" R9A,B to Ramp pin 7 of the IC U1.

The ramp generating circuit is a capacitor "integrate and dump" circuit having a novel design which provides a "super-linear" ramp which sustains sensitive PWM control throughout the range of output power of the power supply. The novel design further tends to reduce "squegging" (which is the tendency to lengthen one pulse while the following pulse is shortened) and core walk in the output transformer T3 (FIG. 3).

The energy supplied from current transformer T2 for generating the ramp is in the form of rectified, but unfiltered, output pulses. The dumping of the integrated charge to start each new ramp is controlled by a pulse supplied from CLK pin 4 on IC U1. The ramp wave form is coupled to pin 7 (IC U1) for comparison with the output available at E/A OUT pin 3 (IC U1) from the internal error amplifier section. The comparison is performed in the PWM comparator section of IC U1 for pulse width adjustment.

The ramp generating circuit further includes a 0.0022 microfarad integrating capacitor C5 charged via the ramp resistor, a 440 ohm damping resistor R12, and the D section of comparator IC U2 which "dumps" the charge integrated in the capacitor C5 upon command from CLK pin 4 (IC U1) and which utilizes a reference voltage from voltage divider R13B, C, D in FIG. 4A.

The other connections of the ramp generating circuit in FIG. 4B follow. The capacitor C5 has one terminal connected via the 440 ohm damping resistor R12 to the RAMP pin 7 (IC U1) and the other terminal of capacitor C5 is connected to ground. The D section of comparator IC U2 has its collector output at pin 13 (FIG. 6B) coupled to the ungrounded terminal of capacitor C5. Pin 12 of IC U2, which represents the internal ground of the comparator output, is also connected to ground, thus placing the comparator output in parallel with the integrating capacitor C5 for "dumping". The inverting input pin 10 of the comparator U2D is connected to the clock pin 4 of the IC U1, while the non-inverting input pin 11 of U2D is connected to a tap on the voltage divider consisting of the three 2.2K resistors R13B,C,D (FIG. 4A), creating a +3.4 volt bias at pin 11.

When the voltage on the non-inverting or positive input pin 11 of U2D exceeds the voltage on the inverting or negative input pin 10, the collector output of U2D is high and the capacitor C5 is presented with an open circuit permitting integration of charge, and the comparator may be said to be "off". When the voltage on pin 10 of U2D exceeds the voltage on pin 11, the collector output is low and presents a low impedance between the output pin 13 and ground and the comparator U2D may be said to be "on". When the comparator is "on" the capacitor C5 is presented with a low impedance and quickly and completely discharges, i.e., is "dumped".

The comparator U2D is connected to dump capacitor C5 at the command of the clock pulse from PWM control IC U1. The positive input pin 11 of the comparator is presented with a +3.4 volt fixed bias, while the negative input pin is connected to the clock pin 4 of the IC U1. When the clock pulse is low it is approximately 2.3 volts, insufficient to turn "on" the comparator. When the clock pulse is high it is approximately 4 volts and is sufficient to turn on the comparator, thereby quickly and completely discharging the integrating capacitor C5 (FIG. 4B).

The generation of the ramp occurs in the following sequence. The sequence may be assumed to start with the ramp capacitor C5 discharged. The start of a new ramp will not occur until the next current pulse arrives from the current transformer T2 (FIG. 4C), as the next alternate diagonal pair of transistors (e.g., Q7, Q10, assuming Q8, Q9 have been turned off) in the transistor bridge (FIG. 4C) conducts. The capacitor C5 then continues to charge until the pulse in the current transformer T2 is terminated under the influence of the PWM control. When the PWM pulse terminates, resistance R9A,B (FIG. 4B) commences to discharge ramp capacitor C5. At an instant established by the value of capacitor C8, connected to CT (capacitor timing) pin 6 of IC U1, the clocking pulse at CLK pin 4 is generated, and all residual charge on the integrating capacitor is removed by comparator U2D. The integrating capacitor is thus readied to generate the next ramp.

The present ramp circuit shown in FIG. 4B provides a "super linear" ramp to maintain sensitivity of the PWM control of the output power at the higher power levels. This arises from the nature of the energization provided to the ramp generating circuit.

The energy for generating the ramp is supplied from the rectified and unfiltered output of the current transformer T2 (FIG. 2C). This output current consists of a series of spaced positive-going pulses with upward sloping "roofs". The pulses have steep leading and trailing edges with an average 60% "on" time and 40% "off" time. The pulses used to generate the ramp have a minimum value of 12 to 14 volts (during the "on" time) while the integrating capacitor C5 charges to approximately four volts. With an upward sloping roof, the voltage difference between the rectified DC voltage (during the "on" time) and the integrated voltage on the capacitor C5, which is the voltage across charging resistor R9A,B, will continue to increase during the course of the PWM pulse. With the indicated circuit parameters, the upward sloping roof of the pulses provides a 40% to 50% increase in value between the start and finish of each pulse. Thus the voltage difference between that attributable to the integrated charge on the capacitor C5 and that coupled to the ramp resistor R9A,B at the output terminal of rectifier bridge CR6-9 will increase during the course of generating each ramp. By these increases the voltage versus time plot of the ramp avoids the decreasing slop characteristic of a conventional RC ramp. In a PWM environment, a decreasing slope causes a loss in sensitivity of the output control at higher output levels. The present novel arrangement provides a ramp with a linear or slightly increasing slope. A fixed slope maintains control sensitivity and an increasing slope achieves additional sensitivity at the upper power limit.

The upward sloping roof of the current pulses from the current transformer T2 results in part from the design of the output filter of the power supply which, as shown in FIG. 3, includes the somewhat smallish 10 microhenry series inductor L3 that is connected to the 2800 microfarad capacitor 21. The product of the inductance and capacitance of the two filter elements determines the smoothness of the output voltage supplied to the load. The LC product in this case provides the required smoothness. However, the inductance of the inductor L3 is selected for the additional purpose of achieving the desired sloping roof in the current wave form derived from the current transformer T2 (FIG. 4C). The optimum value for the inductance selected here is smaller than an inductance selected for conventional output filtering considerations. The upward sloping roof on the current pulse, derived by current transformer T2, is also caused by a current Im attributable to the magnetizing inductance of power transformer T3. The magnetizing current, Im, produces a relatively small effect compared to the current reflected by the 10 microhenry choke L3 in the output filter.

The slope of the roof of the current wave form is due to the size of the inductance of the choke L3 in the output filter. The current in the choke L3 ramps up and down with each pulse in the transformer secondary. The current rises when the pulse is on and falls when the pulse is off, according to the equation:

$$I = VT/L$$

where
   I is the value of the triangular 60 Khz ripple current flowing in the choke, V is the voltage across the choke inductor sustained during the time interval T, ideally the pulse duration; and L is the inductance of the choke.

The equation, which is a variation of the fundamental equation defining inductance ($e = L\, di/dt$) implies that the current ripple will increase as the voltage of the pulse increases or the inductance decreases.

The inductance of the filter choke L3 is selected to optimize several considerations. The small 10 microhenry value selected to facilitate the sloping roof of the current wave form still permits one to achieve the desired smoothness of the filter output, i.e., less than 1%, but the choke inductance cannot be reduced without limit. The choke inductance must be large enough to keep current flowing in the choke at all times; it must be large enough to keep the RMS current supplied to the output capacitor 21 within reasonable limits; and it must be large enough to limit the stress on the available power transistors. However, the choke cannot be too large. It must be small enough to provide adequate large signal bandwidth (a lamp starting consideration) and provide, for low cost and low weight, a small footprint and low I squared R losses. Also, as stated initially, it must be small enough to provide a super-linear RAMP waveform. On the issue of stress on the power transistors, the traditional choke inductance provides approximately 20% peak to peak current ripple, which represents a 10% additional stress on the power transistors during turn-off. In the present embodiment, significantly higher ripple (40%) is used with 20% additional stress being applied to the power transistors. Thus stress-tolerant devices are preferred. The insulated gate bi-polar transistors, herein employed, represent a new, stress-tolerant high power transistor which combines features of the bi-polar transistor with the field effect transistor, combining in particular, conductivity modulation, absent in MOSFET devices, with field effects. The result is a device which tolerates greater operating voltages, greater current stresses, and uses a smaller, low cost package.

The design constraints on the power supply required to achieve a super-linear ramp have not been costly, since reduced inductor size, adequate capacitor size and insulated gate bi-polar switching devices, given the objective of achieving a given high power level (e.g., 2 KW) are, in fact, cheaper than the corresponding components in a more traditional 2 KW power supply. Additionally, deratings are possible at the 2 KW level that permits the MTBF (mean time between failure) of insulated gate bi-polar transition to exceed those of MOSFET transistors.

A further novel feature of the ramp generation circuit of FIG. 4B is the provision of the 440 ohm damping resistor R12 connected between the RAMP pin 7 of IC U1 and the ungrounded terminal of the ramp capacitor C5. Its presence tends to reduce "squegging" and core walk in the output transformer T3 (FIG. 3). The resistor R12 acts to increase the bandwidth of the PWM comparator loop by isolating the PWM comparator input from the shunting effect of the 0.0022 microfarad ramp capacitor C5. An upper limit on the band width of the PWM comparator loop is set by a small 220 picofarad capacitor C9, connected between the PWM comparator's input pins (pins 3 and 7 of IC U1). The damping resistor changes the customary low pass characteristic of the feedback loop to one which slopes down initially and then flattens out into an all pass characteristic, limited only at the very highest frequencies by the small 220 picofarad capacitor C9. The effect on regulator performance is to further reduce the tendency toward squegging, already reduced by the linear or rising slope of the ramp, and to give generally greater loop stability. However, the presence of damping resistor R12 in providing greater high frequency response at the RAMP pin 7 of IC U1 allows fault transient conditions to have a rapid effect in crossing the comparator threshold and terminating the cycle prematurely.

The damping resistor R12 (FIG. 4B) also reduces core walk in the power transformer T3 (FIG. 3). Core walk occurs when perfect AC symmetry is lacking in the wave form applied to the transformer primary. This causes a current to build up near the trailing edge of pulses of one polarity. This current must cause the voltage on the pulse to decrease, thus correcting the effect of core walk, or saturation and failure may occur. In the pulse by pulse current mode system, characteristic of the present system, the increased primary current will cause the primary current pulse to terminate sooner, thus correcting core walk. The linear or increasingly sloped ramp also tends to reduce core walk. The damping resistor R12 provides further immunity to core walk in that it allows a smaller amount of saturation current to provide for early pulse termination. Without the damping resistor R12 the integrating capacitor C5 (FIG. 4B) would filter out the rapidly rising trailing edge and full saturation could easily occur in the presence of noise.

The circuit solution to core walk under no load conditions is aided by inclusion of an air gap of a few thousands of an inch in the core of power transformer T3 (FIG. 3). This allows the magnetizing current on the primary winding 60 to be used to operate the current feedback loop even when there is no load current. The deliberate increase of the magnetizing inductance by the presence of an air gap causes the current ramp to exist even under no load conditions and permits the existence of a signal that can be used to prevent eventual saturation.

In conclusion, applicant has provided a power supply suitable for use with a short-arc lamp in a suitably controlled pulse by pulse current mode PWM regulation scheme of improved performance and reduced cost. In addition to the super linear ramp generator which provides improved regulation with simplicity and lost cost, the supply also lowers cost and improves reliability by using the voltage sense winding 63 (FIG. 3) to both sense secondary voltage and supply low voltage to power the control IC, this being possible as a result of the introduction of a new and novel transconductance regulator discussed herein. Likewise, the winding 62 (FIG. 3) supplying energy for Phase II transition ($-105$ VDC) is also used to power the 24 volt low voltage bus on the Phase I/II board and, through another transconductance regulator, operates the fan, relays, etc. These savings in windings on the power transformer T3 not only save direct costs in labor and material but indirect costs in connectors and compactness and air flow obstruction. The simplicity of the design and the reliability of operation, in part due to the new and novel features herein described, permit achievements of a reliable design which exceeds 50,000 hours MTBF.

What is claimed is:

1. In an electrical power supply for providing a low ripple regulated DC output to a short arc lamp load, the combination comprising A. means for supplying sustained DC energy;
B. means to convert said sustained DC energy to pulses of alternating polarity at a high, above-audible repetition rate comprising
   1. a power transformer (PT) having a primary winding and a first secondary winding;
   2. alternately conducting transistor switches for connecting said DC energy supply means to supply pulses of alternating polarity to said PT primary winding;
C. rectification means connected to said first PT secondary winding to convert said alternating pulses to one polarity; and
D. an inductor input inductor capacitor filter connected in circuit with said first PT secondary winding and said rectification means to provide a sustained low ripple DC output for a load connected thereto, the inductance of the inductor in said filter being small to cause the current therein to have at least a 40% to 50% sloping roof for the duration of each pulse
E. Pulse to pulse current mode pulse width modulation means connected to the control electrodes of said transistor switches comprising
   1. a current transformer (CT) having a primary and a secondary winding, the CT primary winding being connected in the current path of at least one transistor switch to sense the current in said PT primary winding;
   2. a sensed current conversion circuit coupled to said CT secondary winding to convert said sensed PT primary current into a current which emulates the rectified PT secondary current in said inductor, said conversion circuit comprising and RC network;
   3. decoupling means coupling said RC network to said CT secondary winding; and
   4. pulse width modulating integrated circuit (PWM IC) means coupled to said sensed current conversion circuit for response to said emulating current for pulse width modulating said pulses of alternating polarity, connected in a degenerative feedback loop for controlling average power in the load, and comprising a comparator requiring a ramp at the pulse repetition rate for pulse width timing; and
   5. a ramp generating circuit coupled to said CT secondary winding, said decoupling means isolating said sensed current conversion circuit from said ramp generating circuit.

2. The combination set forth in claim 1, wherein said decoupling means is a rectifier.

3. The combination set forth in claim 2 wherein said PT has a second secondary winding for sensing the flux and thereby sensing the voltage across said first PT secondary winding; and
said PWM IC means being coupled to said second secondary winding for joint response with said emulating current to sense average power.

4. The combination set forth in claim 3 wherein power calculation means are provided for weighting said emulating current, weighting said sensed voltage and summing said quantities to obtain an approximation of the power supplied to said load prior to application to said PWM IC means.

5. The combination set forth in claim 1 wherein said ramp generating circuit includes a charging resistor and an integrating capacitor whose values are chosen in combination with said at least 40% to 50% sloping roof to form a ramp having constant or gradually increasing slope during the switch conduction time.

6. The combination set forth in claim 5 wherein said ramp generating circuit is adjusted to provide a final voltage in said integrating capacitor substantially smaller than the input voltage to further sustain an ever-increasing slope for said ramp.

7. The combination set forth in claim 5 wherein the ratio of the input voltage of said ramp generating circuit to the peak of the generated ramp is approximately 13 to 4.

8. The combination set forth in claim 1 wherein said PT transformer has a decreased magnetizing inductance designed to facilitate the generation of an ever-increasing slope for said ramp.

9. The combination set forth in claim 8 wherein decreased magnetization inductance is provided by an air gap to decrease the magnetizing inductance and increase the slope of said ramp.

10. The combination set forth in claim 5 wherein said pulse repetition rate is approximately 30 Khz, the inductance of said inductor is approximately 10 microhenries and the capacity of the capacitor in said filter is approximately 3000 microfarads and the voltage for energizing said first ramp is approximately 13 volts, with the voltage across said integrating capacitor being limited to less than five volts.

11. The combination set forth in claim 3 wherein said second PT secondary winding also energizes said PWM IC means.

12. The combination set forth in claim 1 wherein said PWM IC means further includes an emergency shut down circuit; and
said CT secondary winding is coupled to said emergency shut down circuit for sensing over-current and turning off said alternately conducting transistor switches.

13. The combination set forth in claim 1 wherein said first PT secondary winding is designed to provide Phase III or "run" energization for said short arc lamp load, and
a third PT secondary winding is provided to supply Phase II or glow to arc transition energization to said lamp, and
means responsive to the state of the arc lamp are provided to control the application of Phase II energization.

14. The combination set forth in claim 13 wherein a doubler circuit is provided connected to said third PT secondary winding for phase II energization, and
rectification and filtering means are provided connected to said third PT secondary winding to convert the bi-directional pulses to pulses of one polarity and to create a sustained DC output to energize said phase II control means.

15. The combination set forth in claim 14 wherein said third PT secondary winding also supplies via said rectification and filtering means energization to
a) a fan for cooling the power supply;
b) a relay for operating ignition means during phase I operation of said arc lamp; and
c) a relay for controlling inrush current during initial mains energization of the power supply.

16. In an electrical power supply for providing a low ripple regulated DC output to a short arc lamp load, the combination comprising
   A. means for supplying sustained DC energy;
   B. means to convert said sustained DC energy to pulses of alternating polarity at a high, above-audible repetition rate, comprising
      1. a power transformer (PT) having a primary winding and at least a first and a second secondary winding;
      2. alternately conducting transistor switches for connecting said DC energy supply means to supply pulses of alternating polarity to said PT primary winding;
   C. first rectification means connected to said first PT secondary winding to convert said alternating pulses to one polarity; and
   D. a choke input inductor capacitor filter connected in series with said first PT secondary winding and said rectification means to provide a sustained low ripple DC output for Phase III or run energization of said short arc lamp;
   E. PWM modulation means connected to the control electrodes of said transistor switches comprising
      1. means to sense the current in said PT; and
      2. means responsive to said sensed current connected in a degenerative feedback loop for control of said modulation means, for regulation;
   F. means to supply Phase II or glow to arc transition energization to said short arc lamp load comprising said PT second secondary winding; and
   G. means to control the application of Phase II energization to said short arc lamp load responsive to the state of the arc lamp.

17. The combination set forth in claim 16 wherein
   said Phase II supply means further includes a doubler circuit connected to said second PT secondary winding; and
   second rectification means connected to said second PT secondary winding to convert the pulses of alternating polarity to pulses of one polarity to create a sustained DC output.

18. The combination set forth in claim 17 wherein
   said power transformer has a third secondary for sensing the flux and thereby the voltage across said PT first secondary winding; and
   said pulse width modulation means being jointly responsive to sensed current and to said sensed voltage.

* * * * *